US012811889B2

(12) United States Patent
Jin et al.

(10) Patent No.: US 12,811,889 B2
(45) Date of Patent: Nov. 24, 2026

(54) PROVIDING DISTRIBUTED AI MODELS IN COMMUNICATION NETWORKS AND RELATED NODES/DEVICES

(71) Applicant: Telefonaktiebolaget LM Ericsson (publ), Stockholm (SE)

(72) Inventors: Yifei Jin, Solna (SE); Zhang Fu, Stockholm (SE); Massimo Condoluci, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 486 days.

(21) Appl. No.: 18/035,634

(22) PCT Filed: Nov. 26, 2020

(86) PCT No.: PCT/SE2020/051130
§ 371 (c)(1),
(2) Date: May 5, 2023

(87) PCT Pub. No.: WO2022/115011
PCT Pub. Date: Jun. 2, 2022

(65) Prior Publication Data
US 2023/0412513 A1 Dec. 21, 2023

(51) Int. Cl.
*H04L 47/2475* (2022.01)
*H04L 41/0681* (2022.01)
(Continued)

(52) U.S. Cl.
CPC ...... *H04L 47/2475* (2013.01); *H04L 41/0681* (2013.01); *H04L 41/16* (2013.01); *H04L 67/141* (2013.01); *H04W 28/0268* (2013.01)

(58) Field of Classification Search
CPC . H04L 47/2475; H04L 41/0681; H04L 41/16; H04L 67/141; H04L 67/10;
(Continued)

(56) References Cited

U.S. PATENT DOCUMENTS 10,009,229 B2 * 6/2018 Pani .................... H04L 41/0894
10,341,427 B2 * 7/2019 Jalan ........................ H04L 45/74
(Continued)

OTHER PUBLICATIONS

International Search Report and Written Opinion of the International Searching Authority, PCT/SE2020/051130, mailed Sep. 27, 2021, 19 pages.
(Continued)

*Primary Examiner* — Sargon N Nano
(74) *Attorney, Agent, or Firm* — Sage Patent Group

(57) ABSTRACT

In the present disclosure, methods of operating a translation node in a communication network are discussed. The translation node receives Application service information for an application service, a distributed Artificial Intelligence AI model for the application service, and Model Deployment Map MDM information for the application service, translates the MDM information for the application service into network Quality of Service QoS parameters for the application service, and provides the distributed AI model with the network QoS parameters for distribution to at least one other node of the communication network. Related methods of operating SMF and NDWAF nodes are also discussed.

8 Claims, 28 Drawing Sheets

(51) Int. Cl.
*H04L 41/16* (2022.01)
*H04L 67/141* (2022.01)
*H04W 28/02* (2009.01)

(58) Field of Classification Search
CPC . H04L 41/0895; H04L 41/40; H04L 41/0803; H04L 45/145; H04L 41/5009; H04L 41/5054; H04L 67/12; H04W 28/0268; H04W 28/02; H04W 72/04; H04W 76/15; H04W 76/27; H04W 8/20; H04W 76/10; G06N 20/00
USPC .......................................................... 709/228
See application file for complete search history.

(56) References Cited

U.S. PATENT DOCUMENTS 10,750,371 B2 * 8/2020 Bogineni ............ H04L 41/5025
11,228,532 B2 * 1/2022 Chu .................... H04L 41/0894
11,429,853 B2 * 8/2022 Zhang ................... G06F 18/285
11,481,571 B2 * 10/2022 Kiemele ................ G06V 40/10
11,734,611 B2 * 8/2023 Liu ....................... G06F 18/285 706/49
11,812,294 B2 * 11/2023 Eklöf .................... H04W 24/10
12,627,616 B2 * 5/2026 Chong ...................... G06F 9/50
2019/0318268 A1 * 10/2019 Wang .................. H04L 67/1095
2020/0014607 A1 1/2020 Gangadhar et al.
2020/0196155 A1 * 6/2020 Bogineni ............... G06N 20/00
2020/0314286 A1 * 10/2020 Aizono ................... G06T 11/10
2020/0322767 A1 * 10/2020 Väänänen .............. G08B 21/24
2020/0382968 A1 * 12/2020 Gupta ................... H04L 41/145
2023/0072080 A1 * 3/2023 Ohlsson .................. H04L 63/12
2023/0334369 A1 * 10/2023 Liu ......................... H04L 67/59
2023/0412513 A1 * 12/2023 Jin ...................... H04L 41/5054
2024/0172283 A1 * 5/2024 Alabbasi ................ G06N 3/092
2024/0259311 A1 * 8/2024 Ball .................... H04L 41/0886

OTHER PUBLICATIONS

Wichadakul, Duangdao et al., "A Translation System for Enabling Flexible and Efficient Deployment of QoS-Aware Applications in Ubiquitous Environments," Advances in Intelligent Data Analysis XIX, 2002, pp. 210-221.
3GPP TR 22.874 v0.1.0 (2020-09) (S1-203382); 3rd Generation Partnership Project; Technical Specification Group Services and System Aspects; Study on traffic characteristics and performance requirements for AI/ML model transfer in 5GS (Release 18); 55 pages.
China Telecom et al., "Use Case of AI Model Management as a Service," 3GPP TSG-SA WG1 Meeting #92e, S1-204031, Electronic Meeting, Nov. 11-20, 2020, 3 pages.
3GPP TS 23.501 v16.6.0 (Sep. 2020); 3rd Generation Partnership Project; Technical Specification Group Services and System Aspects; System Architecture for the 5G System (5GS); Stage 2 (Release 16); 447 pages.
3GPP TS 23.502 v16.6.0 (Sep. 2020); 3rd Generation Partnership Project; Technical Specification Group Services and System Aspects; Procedures for the 5G System (5GS); Stage 2 (Release 16); 597 pages.
Teerapittayanon, Surat et al., "Distributed Deep Neural Networks over the Cloud, the Edge and End Devices," 2017 IEEE 37th International Conference on Distributed Computing Systems, 12 pages.
Oppo et al. "New WID on Study on traffic characteristics and performance requirements for AI/ML model transfer in 5GS," 3GPP TSG-SA WG1 Meeting #88, S1-193606, Reno, Nevada, USA, Nov. 18-22, 2019, 3 pages.

* cited by examiner

PROVIDING DISTRIBUTED AI MODELS IN COMMUNICATION NETWORKS AND RELATED NODES/DEVICES

CROSS REFERENCE TO RELATED APPLICATIONS

This application is a 35 U.S.C. § 371 national stage application of PCT International Application No. PCT/SE2020/051130 filed on Nov. 26, 2020, the disclosure and content of which is incorporated by reference herein in its entirety.

TECHNICAL FIELD

The present disclosure relates generally to communications, and more particularly to communication methods and related devices and nodes supporting wireless communications.

BACKGROUND

Distributed Artificial Intelligence D-AI is discussed below.

In the evolution of 5th Generation (5G) and beyond mobile networks, Artificial Intelligence AI applications with heavy computation resource requirements are involved in all phases of the communications. Under the constrain of limited computation resources, and battery lifetime of UEs as well as the overhead of transferring all the data to the machine learning ML server, distributed AI (D-AI) is brought up as having parts of the algorithm deployed among the communication network and performing computations as the communication proceeds.

On the other hand, with privacy concerns, it may become an ethical and/or legal issue when data centers are allowed to retrieve the user experience related data from a user's private device for commercial use. Federated learning FL has been brought up to address this issue by transferring weight(s) of the trained model, other than data, to protect users from privacy leakage. Use of Federated Learning FL, however, may still require every worker to have the capability to perform the full-version of the Machine Learning ML model.

FIG. 1 (from FIG. 4 of Reference [1]) illustrates an Algorithmic View of an example of a Convolution-DDNN deployment. In FIG. 1, the Fully Connect (FC) layers and Convolution (ConvP) layers (indicated with crosshatching) are the parts that deploy on end devices (indicated with dashed line boxes). Aggregation computation is assigned on edge and cloud. A latter layer with external output is deployed on the cloud which may have fewer computation constrains (e.g., battery, availability, etc.) and more computation capability. The structure of FIG. 1 is discussed in greater detail with respect to FIG. 4 of Reference [1].

Considering the inherent distributed nature and constrained performance in every individual node, Distributed Deep Neural Networks (e.g., see FIG. 1 of Reference [1]) is one of the most commercially implemented distributed AI forms. Recent studies have contributed to having DDNN deployed in a distributed computing hierarchy, e.g., distributed between end device(s) and the cloud. For a well-trained DNN, it is feasible to migrate the neural network to a distributed system under human data scientist knowledge. The motivation is both having the AI algorithm match accuracy, communication and latency requirements, and share the inherent merit of a distributed system including fault tolerance and privacy. FIGS. 2A, 2B, 2C, 2D, 2E, and 2F illustrates concepts of a DDNN.

FIGS. 2A, 2B, 2C, 2D, 2E, and 2F (from FIG. 2 of Reference [1]) illustrate an overview of DDNN architectures. The vertical lines represent the DNN pipeline, which connects the horizontal bars (Neural Network NN layers in FIG. 1). FIG. 2A illustrates a standard DNN (processed entirely in the cloud), FIG. 2B introduces end devices and a local exit point that may classify samples before the cloud, FIG. 2C extends FIG. 2B by adding multiple end devices which are aggregated together for classification, FIGS. 2D and 2E extend FIGS. 2B and 2C by adding edge layers between the cloud and end devices, and FIG. 2F shows how the edge can also be distributed like the end devices. Structures of FIGS. 2A, 2B, 2C, 2D, 2E, and 2F are discussed in greater detail with respect to FIG. 2 of Reference [1].

Compared with Federated Learning (FL), DDNN can be differentiated in model O&M (operation and management). Federated learning may require a local workers' training in many local agents. Then, it may be required to transfer the training outcome to an aggregation point to combine the workers' training result to form a global weight. This may require all the nodes in the federation to have full knowledge of all of the model's hyper-parameters. Yet, DDNN is a distributed deployment approach for a single neural network model, aiming to reach an optimal trade-off between data traffic volume (for transfer of input data to a data center via a network) and end-to-end inference time. The former (input) layer can have little knowledge on how its output will be processed by latter layers of the neural network. DDNN is more widely adapted when there exist constrains on deploying a deep model on the edge/device. Yet for Federated Learning FL, the worker/training agent is expected to hold the full model and even train the full models with couples of batches of data.

FIG. 3 illustrates the basic SBA (Service Based Architecture) of the core network CN in 5G. Network Functions (NFs) expose their abilities as services that can be used by other NFs. In the current 3GPP specification for the 5G core network, the 5G System architecture is defined to support data connectivity and services enabling deployments to use techniques such as Network Function Virtualization and Software Defined Networking. The 5G System architecture may leverage service-based interactions between Control Plane (CP) Network Functions which are identified in Reference [2]. For example, AMF can provide a service that enables an NF to communicate with the user equipment UE and/or the AN (Access Network) through the AMF; and SMF exposes a service that allows the consumer NFs to handle PDU sessions of UEs.

Relevant NFs for the present disclosure include PCF, SMF, NEF as well as AF and NWDAF. As defined in the current 3GPP specifications (e.g., TS23.501, cited as Reference [2]), an AF may send requests to influence SMF routing decisions for traffic of specific PDU Sessions. The AF requests may influence User Plane Function UPF (re) selections and/or allow routing user traffic of a local access to a Data Network DN. A Network Data Analytic Function NWDAF provides analytics on several network Key Performance Indicators KPIs (e.g., network node load, slice load, Quality of Service QoS, Sustainability Analytics, etc.) to different Network Function NF consumers.

If the operator does not allow an AF to access the network directly, the AF shall use the NEF to interact with the 5th Generation Core 5GC.

The AF requests are sent to the Policy Control Function PCF or via the Network Exposure Function NEF. The AF requests that target existing or future Protocol Data Unit PDU Sessions of multiple UE(s) or of any UE are sent via the NEF and may target multiple PCF(s). The PCF(s) transform(s) the AF requests into policies that apply to PDU Sessions. The AF can also request to obtain Quality of Service QoS Sustainability Analytics for specific UEs from NWDAF, where the AF can also provide as input geographical areas and time windows used to tune the generation of QoS Sustainability Analytics.

Furthermore, UEs can have multiple Internet Protocol IP addresses, e.g. IPv6 multihoming or IP addresses with different PDU anchors.

Existing network architectures, however, may not adequately support distributed AI and/or DDNN deployment.

SUMMARY

According to some embodiments of inventive concepts, a method of operating a translation node in a communication network is provided. The translation node receives application service information for an application service, a distributed Artificial Intelligence AI model for the application service, and Model Deployment Map MDM information for the application service. The translation node translates the MDM information for the application service into network Quality of Service QoS parameters for the application service. The translation node provides the distributed AI model with the network QoS parameters for distribution to at least one other node of the communication network.

According to such embodiments, by providing translation of MDM information into network QoS parameters, DDNN deployment may be more efficiently implemented across a communication network, and/or user traffic management may be more efficiently configured. Moreover, impact on legacy operations/nodes/functions may be reduced.

According to some embodiments of inventive concepts, a method of operating a core network CN node in a communication network is provided. The CN node acquires a distributed artificial intelligence AI model for a communication device, wherein the distributed AI model includes a cloud model portion and a cloud model weight, an edge model portion and an edge model weight, and a local model portion and a local model weight. The CN node transmits the cloud model portion and the cloud model weight to a user plane function UPF node of the communication network. The CN node transmits the edge model portion and the edge model weight and the local model portion and the local model weight for distribution to a radio access network RAN node associated with the communication device.

According to such embodiments, an efficient/dynamic deployment may be provided for a distributed AI approach (e.g., DDNN) to set up the user plane for distributed AI traffic. Moreover, such deployments may be provided with reduced impact on legacy operations/nodes/functions.

According to some embodiments of inventive concepts, a method of operating a core network CN node in a communication network is provided. The CN node receives a distributed artificial intelligence AI model for an application service, wherein the AI model includes network QoS parameters for the application service. The CN node reports an alarm based on the network QoS parameters for the application service.

According to such embodiments, a more efficient collection of performance information from distributed AI components may be provided. Moreover, this performance information may be used to provide feedback to the application for potential redeployment.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 11:
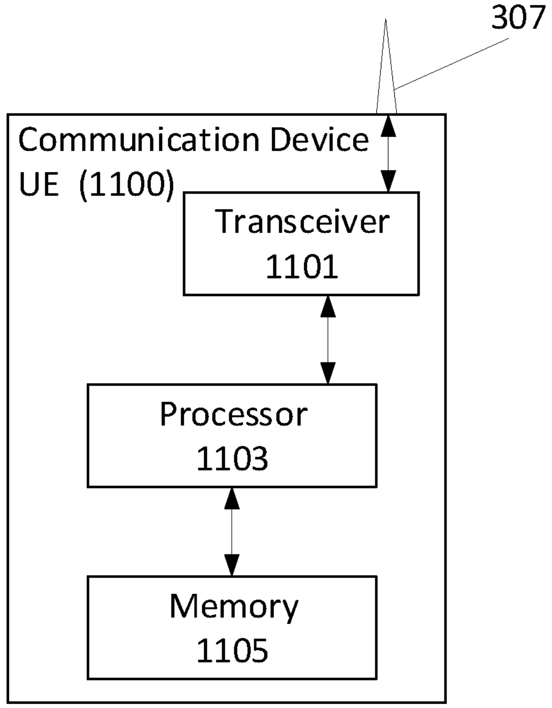
FIG. 11 is a block diagram illustrating a wireless device UE according to some embodiments of inventive concepts.

FIG. 11 is a block diagram illustrating elements of a communication device UE 1100 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 1100 may be provided, for example, as discussed below with respect to wireless device 4110 of FIG. 17.) As shown, communication device UE may include an antenna 1107 (e.g., corresponding to antenna 4111 of FIG. 17), and transceiver circuitry 1101 (also referred to as a transceiver, e.g., corresponding to interface 4114 of FIG. 17) including a transmitter and a receiver configured to provide uplink and downlink radio communications with a base station(s) (e.g., corresponding to network node 4160 of FIG. 17, also referred to as a RAN node) of a radio access network. Communication device UE may also include processing circuitry 1103 (also referred to as a processor, e.g., corresponding to processing circuitry 4120 of FIG. 17) coupled to the transceiver circuitry, and memory circuitry 1105 (also referred to as memory, e.g., corresponding to device readable medium 4130 of FIG. 17) coupled to the processing circuitry. The memory circuitry 1105 may include computer readable program code that when executed by the processing circuitry 1103 causes the processing circuitry to perform operations according to embodiments disclosed herein. According to other embodiments, processing circuitry 1103 may be defined to include memory so that separate memory circuitry is not required. Communication device UE may also include an interface (such as a user interface) coupled with processing circuitry 1103, and/or communication device UE may be incorporated in a vehicle.

As discussed herein, operations of communication device UE may be performed by processing circuitry 1103 and/or transceiver circuitry 1101. For example, processing circuitry 1103 may control transceiver circuitry 1101 to transmit communications through transceiver circuitry 1101 over a radio interface to a radio access network node (also referred to as a base station) and/or to receive communications through transceiver circuitry 1101 from a RAN node over a radio interface. Moreover, modules may be stored in memory circuitry 1105, and these modules may provide instructions so that when instructions of a module are executed by processing circuitry 1103, processing circuitry 1103 performs respective operations (e.g., operations discussed below with respect to Example Embodiments relating to wireless communication devices). According to some embodiments, a communication device UE 1100 and/or an element(s)/function(s) thereof may be embodied as a virtual node/nodes and/or a virtual machine/machines.

Figure 12:
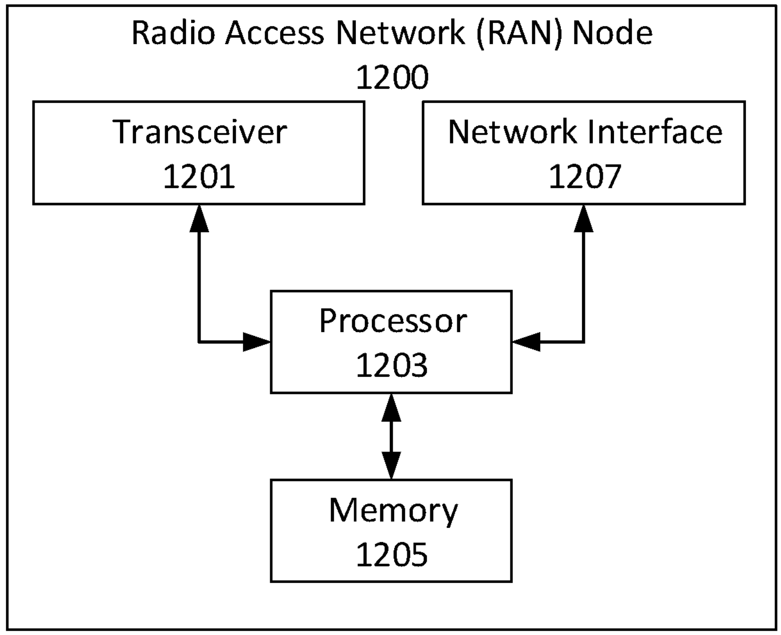
FIG. 12 is a block diagram illustrating a radio access network RAN node (e.g., a base station eNB/gNB) according to some embodiments of inventive concepts.

FIG. 12 is a block diagram illustrating elements of a radio access network RAN node 1200 (also referred to as a network node, base station, eNodeB/eNB, gNodeB/gNB, etc.) of a Radio Access Network (RAN) configured to provide cellular communication according to embodiments of inventive concepts. (RAN node 1200 may be provided, for example, as discussed below with respect to network node 4160 of FIG. 17.) As shown, the RAN node may include transceiver circuitry 1201 (also referred to as a transceiver, e.g., corresponding to portions of interface 4190 of FIG. 17) including a transmitter and a receiver configured to provide uplink and downlink radio communications with mobile terminals. The RAN node may include network interface circuitry 1207 (also referred to as a network interface, e.g., corresponding to portions of interface 4190 of FIG. 17) configured to provide communications with other nodes (e.g., with other base stations) of the RAN and/or core network CN. The network node may also include processing circuitry 1203 (also referred to as a processor, e.g., corresponding to processing circuitry 4170) coupled to the transceiver circuitry, and memory circuitry 1205 (also referred to as memory, e.g., corresponding to device readable medium 4180 of FIG. 17) coupled to the processing circuitry. The memory circuitry 1205 may include computer readable program code that when executed by the processing circuitry 1203 causes the processing circuitry to perform operations according to embodiments disclosed herein. According to other embodiments, processing circuitry 1203 may be defined to include memory so that a separate memory circuitry is not required.

As discussed herein, operations of the RAN node may be performed by processing circuitry 1203, network interface 1207, and/or transceiver 1201. For example, processing circuitry 1203 may control transceiver 1201 to transmit downlink communications through transceiver 1201 over a radio interface to one or more mobile terminals UEs and/or to receive uplink communications through transceiver 1201 from one or more mobile terminals UEs over a radio interface. Similarly, processing circuitry 1203 may control network interface 1207 to transmit communications through network interface 1207 to one or more other network nodes and/or to receive communications through network interface from one or more other network nodes. Moreover, modules may be stored in memory 1205, and these modules may provide instructions so that when instructions of a module are executed by processing circuitry 1203, processing circuitry 1203 performs respective operations (e.g., operations discussed below with respect to Example Embodiments relating to RAN nodes). According to some embodiments, RAN node 1200 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 13:
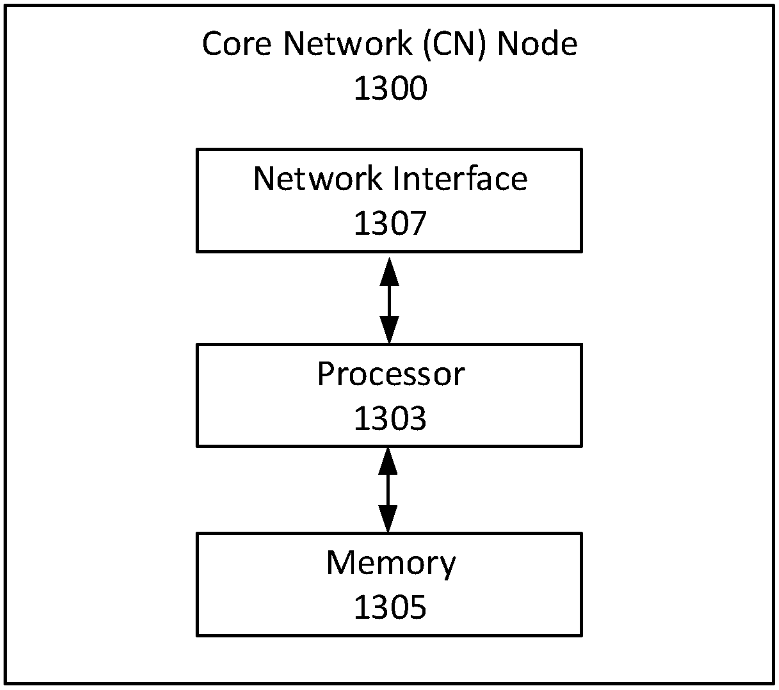
FIG. 13 is a block diagram illustrating a core network CN node (e.g., an AMF node, an SMF node, etc.) according to some embodiments of inventive concepts.

FIG. 13 is a block diagram illustrating elements of a core network CN node (e.g., an SMF node, an AMF node, etc.) of a communication network configured to provide cellular communication according to embodiments of inventive concepts. As shown, the CN node may include network interface circuitry 1307 (also referred to as a network interface) configured to provide communications with other nodes of the core network and/or the radio access network RAN. The CN node may also include a processing circuitry 1303 (also referred to as a processor) coupled to the network interface circuitry, and memory circuitry 1305 (also referred to as memory) coupled to the processing circuitry. The memory circuitry 1305 may include computer readable program code that when executed by the processing circuitry 1303 causes the processing circuitry to perform operations according to embodiments disclosed herein. According to other embodiments, processing circuitry 1303 may be defined to include memory so that a separate memory circuitry is not required.

As discussed herein, operations of the CN node may be performed by processing circuitry 1303 and/or network interface circuitry 1307. For example, processing circuitry 1303 may control network interface circuitry 1307 to transmit communications through network interface circuitry 1307 to one or more other network nodes and/or to receive communications through network interface circuitry from one or more other network nodes. Moreover, modules may be stored in memory 1305, and these modules may provide instructions so that when instructions of a module are executed by processing circuitry 1303, processing circuitry 1303 performs respective operations (e.g., operations discussed below with respect to Example Embodiments relating to core network nodes). According to some embodiments, CN node 1300 and/or an element(s)/function(s) thereof may be embodied as a virtual node/nodes and/or a virtual machine/machines.

In current 3GPP communication systems, protocols within the network may not be adapted to the computation and/or communication co-proceeding for distributed-deployed AI inference components in an application bootstrapping phase of a mobile network (e.g., what signaling and method should be used to deploy different layers of a DDNN into a mobile network and/or what information should be provisioned for different components). For example, it may be undetermined how to decide which layers of a deep neural network should be deployed in which network components (including end user devices), for example, according to the device computation capabilities, latency requirements, data collection intensiveness, computation capabilities of network servers, etc.

One issue may be to address how to express DDNN deployment requirements, combined with network performance matrices, and thus how the corresponding network setup and configuration can be conducted.

Another issue may be to address how the DDNN deployment is handled by the network based on 5G network architecture, for example, including which NFs are impacted, what procedures are impacted, etc.

In the present disclosure, distributed deployment of a DNN in a 5G mobile network for inferencing is discussed. Deployment of a DDNN for learning is not a focus of the present disclosure.

Contribution S1-193606 (also referred to herein as Reference [4]) has been submitted to 3GPP SA1 with a study proposal on AI/ML Model Transfer in 5GS for upcoming Release 18, which has been approved, and related works should start during the second half of 2020. If studies are successfully completed in 3GPP SA1 during Release 18, this means that starting from Release 19 other groups in 3GPP could start working on technical solutions for AI/ML model transfer. This highlights that in 3GPP interest has started to grow in supporting AI/ML model transfer. In current discussions in 3GPP, however, the support of AI/ML model transfer is approached from the perspective of: (i) supporting AI/ML model transfer for mainly centralized AI deployments where "distribution" is seen from the perspective of providing an AI model to a UE upon request and not from a distributed AI approach such as DDNN; (ii) studying the use cases and potential service and performance requirements to identify traffic characteristics of AI/ML model transfer; and (iii) performing a gap analysis on performance requirements for AI/MEL model transfer (e.g., data rate, latency, reliability, coverage and capacity, etc.) for AI/ML model downloading/uploading. From this point of view, until the end of Release 19, 3GPP is not expected to cover network enhancements to support distributed AI architectures such as DDNN.

Support for distributed AI in mobile networks is believed to be a key network feature for upcoming network generations with a focus on an after Release 19 timeframe and can be considered as a native feature for 6G mobile networks.

According to some embodiments of inventive concepts, an approach to deploy DDNN in a service-based mobile network architecture is disclosed. New parameters are defined in the core network control plane signals to enable the application to influence the behavior of relevant network functions.

According to some embodiments of inventive concepts, a 5G system is considered as an example, even though inventive concepts may also target a network feature(s) that could be considered as a baseline and/or native feature of an upcoming mobile network generation(s). Considering 5G systems, the SMF and PCF will setup the user plane for the distributed AI traffic. The present disclosure also considers the NWDAF to collect the performance information from the distributed AI components and to provide feedback to the application for the potential redeployments if needed.

According to some embodiments of inventive concepts, a Model Deployment Map MDM may be provided to express the DDNN which should be used by the network to handle the DDNN deployment. Such a Model Deployment Map may also be used to configure the user traffic management when the user device is involved in the DDNN.

According to some embodiments of inventive concepts, an approach may be provided to deploy a DDNN in a service-based mobile network architecture to reduce/avoid impact with respect to legacy network procedures. Such an approach may also consider UE mobility.

According to some embodiments of inventive concepts, an approach may be provided to update a DDNN deployment dynamically according to variations of network conditions.

Provisioning of parameters from an Application Function AF to the mobile network is discussed below.

Enhancements introduced according to some embodiments of the present disclosure may apply to a mobile network whose system architecture is designed based on a service-based approach with network functions (NFs) providing services to other NFs. In the remainder of the present disclosure, for the sake of illustration, embodiments of inventive concepts are explained as being applied to a 5G system, which has a service-based architecture. It is noted that embodiments of inventive concepts may provide enhancements for distributed AI support in a mobile network, and that this may also be a useful network feature for upcoming network generations (e.g., 6G mobile networks).

According to some embodiments of inventive concepts, for either an application request for distributed deployment of a model in the network, or for the network to suggest a distributed deployment topology for an application service in the network, a blueprint of the deployment methodology is introduced, where the blueprint of the deployment methodology is defined as Model Deployment Map (MDM) and is aimed to include information to describe the AI architecture and associated requirements. Paired with service feature information, MDM may be considered to include: (i) a static part of information which describes the deployment of the DDNN in Mobile network, including deploying device and deployment template; and (ii) a dynamic part that includes the runtime DDNN model performance metrics.

A static part of the MDM may be defined during a bootstrapping phase of the application, wherein the static part of the MDM may include 2 components: UE type information and a respective deployment template. UE type information describes the deploying device of the application, which indicates a computing capability. The UE type information may include 3 categories: 3GPP managed user equipment (UE, handheld device, etc.), 3GPP managed device-to-device D2D service (UAV, UGV, etc.), and 3GPP managed Internet of Things IoT related Features (Sensor). This information indicates a primary classification of the UE's capability to provide inferencing, which could lead to different deployment templates for different UE types.

According to the 3 categories discussed above (i.e., 3GPP managed user equipment, 3GPP managed D2D service, and 3GPP managed IoT related features), a deployment template may be prepared (if the application service is needed) to provide the deployment topology respectively. One example is DDNN where its MDM's deployment template includes: number of layers on each node (e.g., a node may be a UE, a radio access network RAN node or a core network CN function), filter size/number on each node, estimated communication cost (e.g., cost based on exchanging matrix size, latency, communication lifetime, etc.) between nodes. This information may be static unless a new model is updated from the application server. For DDNN, the deployment template is different from a federated learning FL weight aggregation process, since the information indicates a fragment of the model and weight (providing faster inference), instead of a full model's weight. It is also different from a distributed deployment with ensemble technologies, since the model is trained as a whole beforehand and the deployment template is specially for one application service (providing better inference accuracy). Yet, for ensemble tech, all portions may be trained separately and may be assembled in an ad-hoc way for different application purposes.

Further, MDM may contain the model performance metrics when it is deployed in a distributed system in its dynamic part. Referring to FIGS. 2A, 2B, 2C, 2D, 2E, and 2F, this information includes local accuracy and inference time, edge accuracy and inference time and individual accuracy and inference time. These Key Performance Indicators KPIs are noted as: Local accuracy & inference time (LAI); Edge accuracy & inference time (EAI); Cloud accuracy & inference time (CAI); and Individual accuracy & inference time (IAI).

Local accuracy and inference time (LAI) may be provided as the mean accuracy and inference time when exiting 100% samples at the local exit of DDNN, in the UE level.

Edge accuracy and inference time (EAI) may be provided as the mean accuracy and inference time when exiting 100% samples at the edge exit of DDNN, in the cell level.

Cloud accuracy and inference time (CAI) may be provided as the mean accuracy and inference time when exiting 100% samples at the cloud exit of DDNN, in the network level.

Individual accuracy and inference time (IAI) may be provided as the mean accuracy and inference time when deploying the AI model as the MDM deployment information, for a single UE in the network.

The above listed KPIs could also be expressed in other forms in addition to mean, e.g., Xth (e.g. 90th) percentile, minimum value (for accuracy), maximum value (for inference time). In addition, it could be complemented by additional information, e.g., mean KPI plus variance or confidence interval.

Some of the above listed KPIs could also be associated with additional information for triggering adaptations such as: KPI trigger threshold; and in-advance trigger time.

For a KPI trigger threshold, the KPI value has a threshold (e.g., 85%), and in this case an adaptation is triggered when the local accuracy value crosses the threshold (e.g., 85%), to reduce/avoid that adaptation being triggered only when the KPI goes below the minimum desired value.

In-advance trigger time (e.g., 20 seconds) may be used to trigger in-advance adaptation (i.e., before the KPI crosses the associated threshold). The in-advance trigger timer parameter may be used such that an adaptation is triggered when it is predicted that within the in-advance trigger time (e.g. within 20 seconds) the KPI would cross the associated threshold.

According to some embodiments, the KPI trigger threshold and/or in-advance trigger time parameters may be applied only to a subset of above KPIs (e.g., to inference time but not to accuracy). One example is when edge inference time has an associated trigger threshold (e.g., trigger an adaptation if the performance value of edge inference time crosses the threshold of 95% of the KPI value) and potentially an associated in-advance trigger time (e.g., trigger now an adaptation because in 20 seconds it is expected that edge inference time will cross the threshold of 95% of the KPI value).

Figure 1:
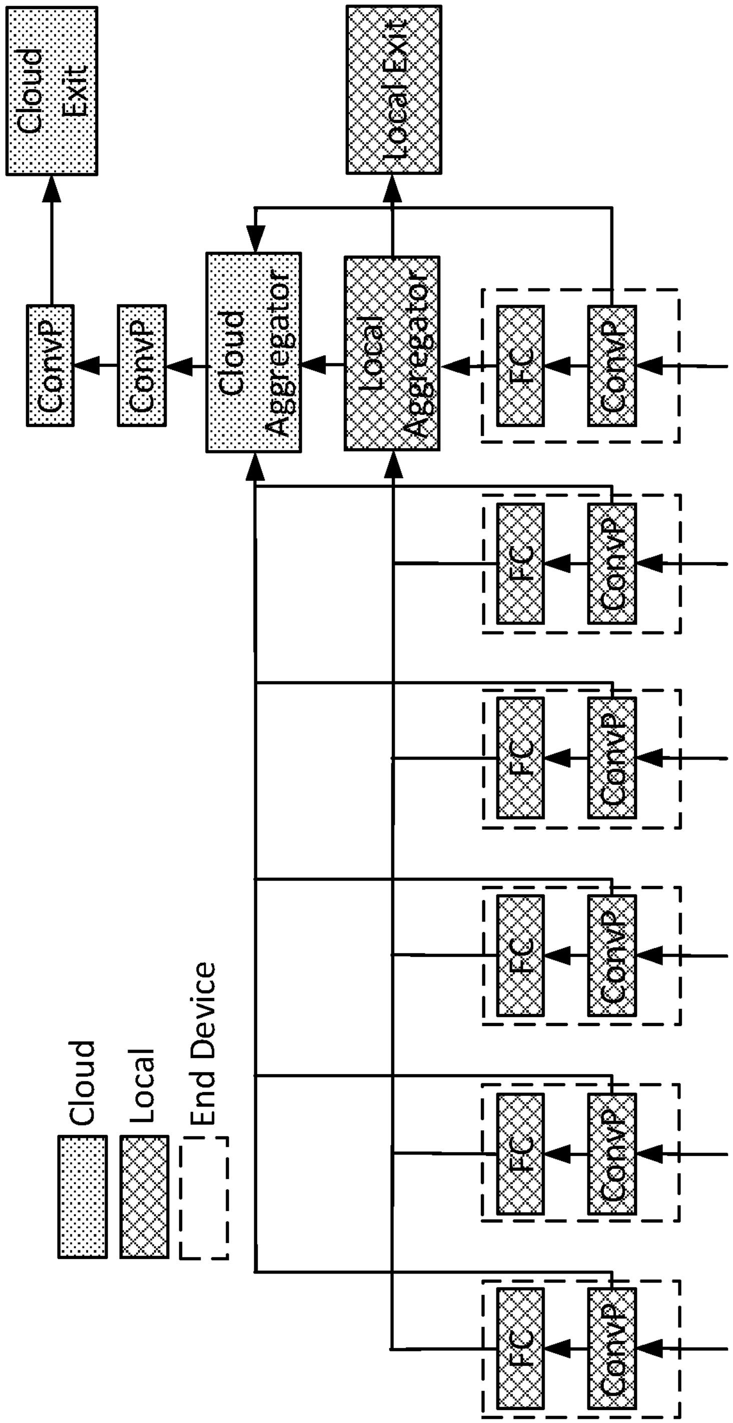
FIG. 1 is a diagram illustrating an algorithmic view of a convolution-DDNN deployment.
Figures 2A, 2B, 2C:
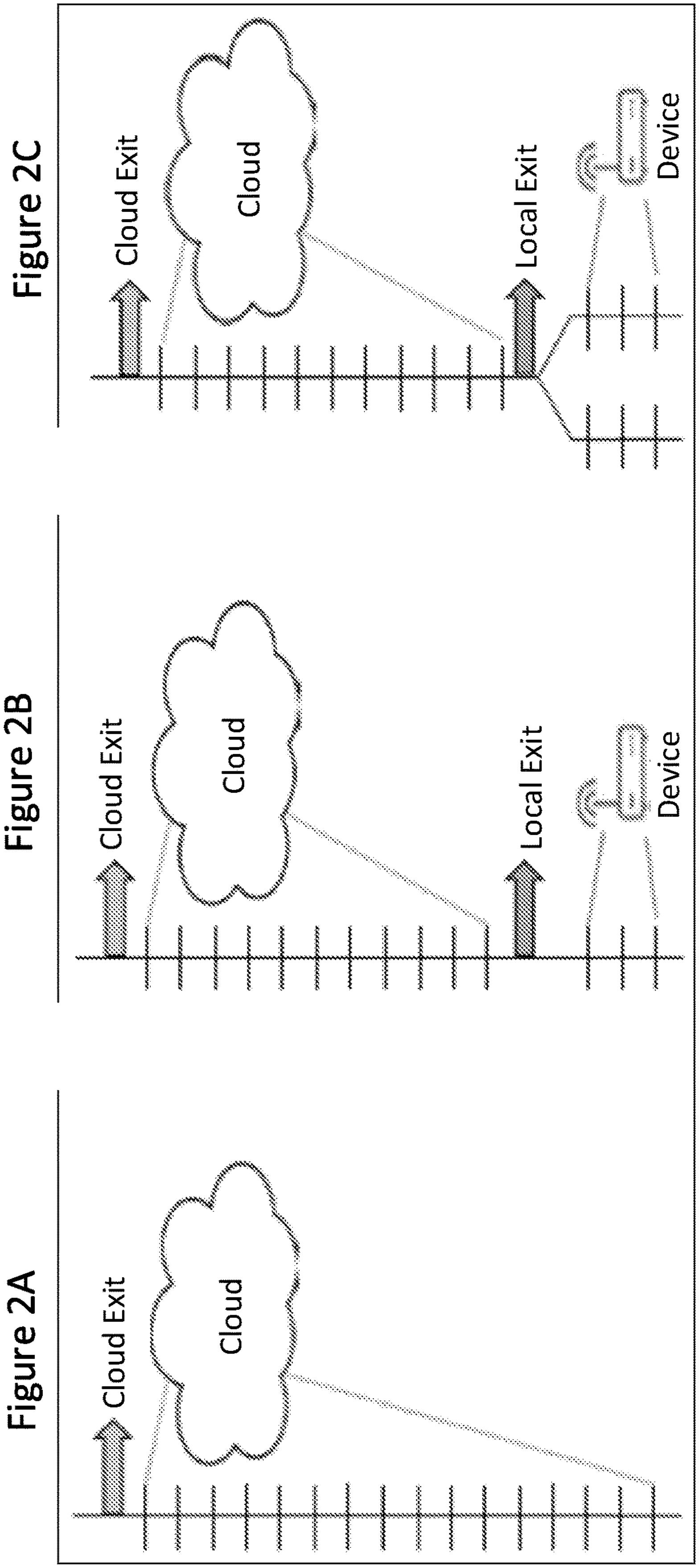
FIGS. 2A, 2B, 2C, 2D, 2E, and 2F are diagrams illustrating an overview of DDNN architectures.
Figures 2D, 2E, 2F:
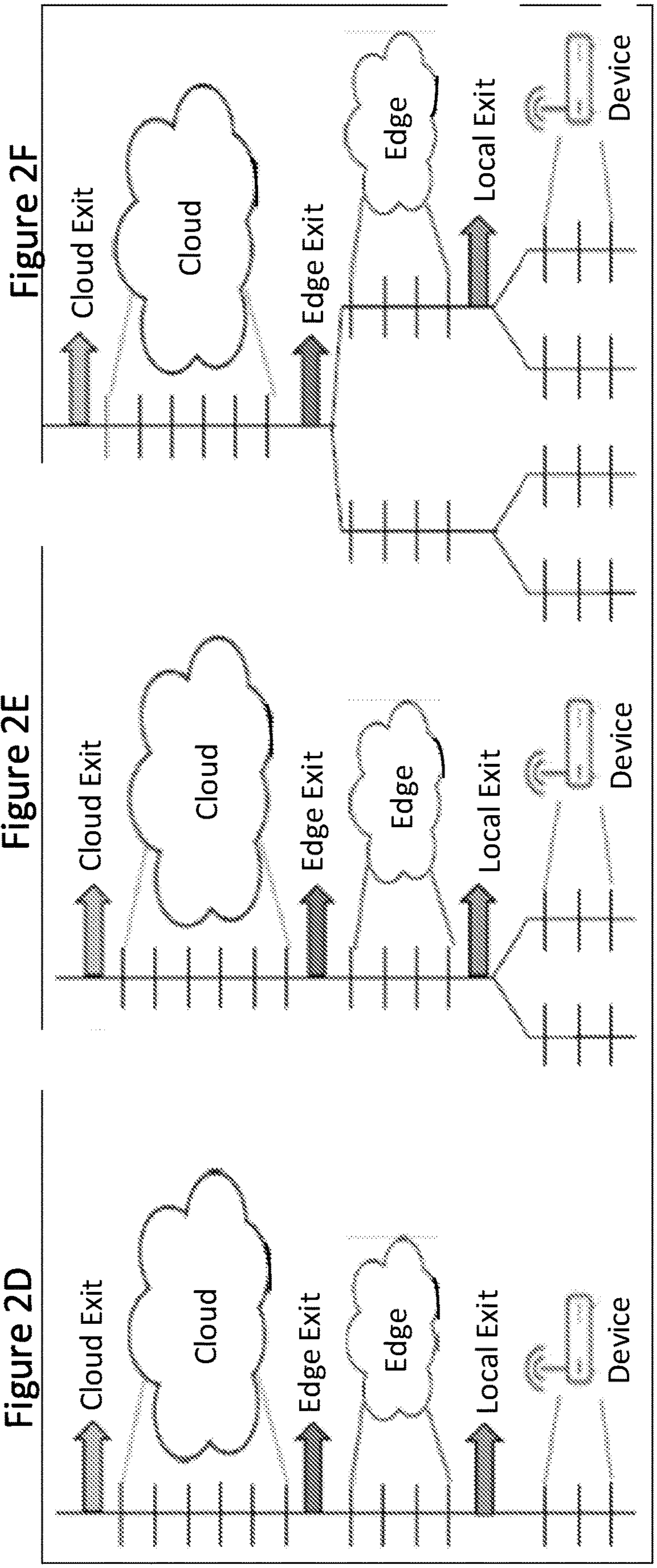
Figure 3:
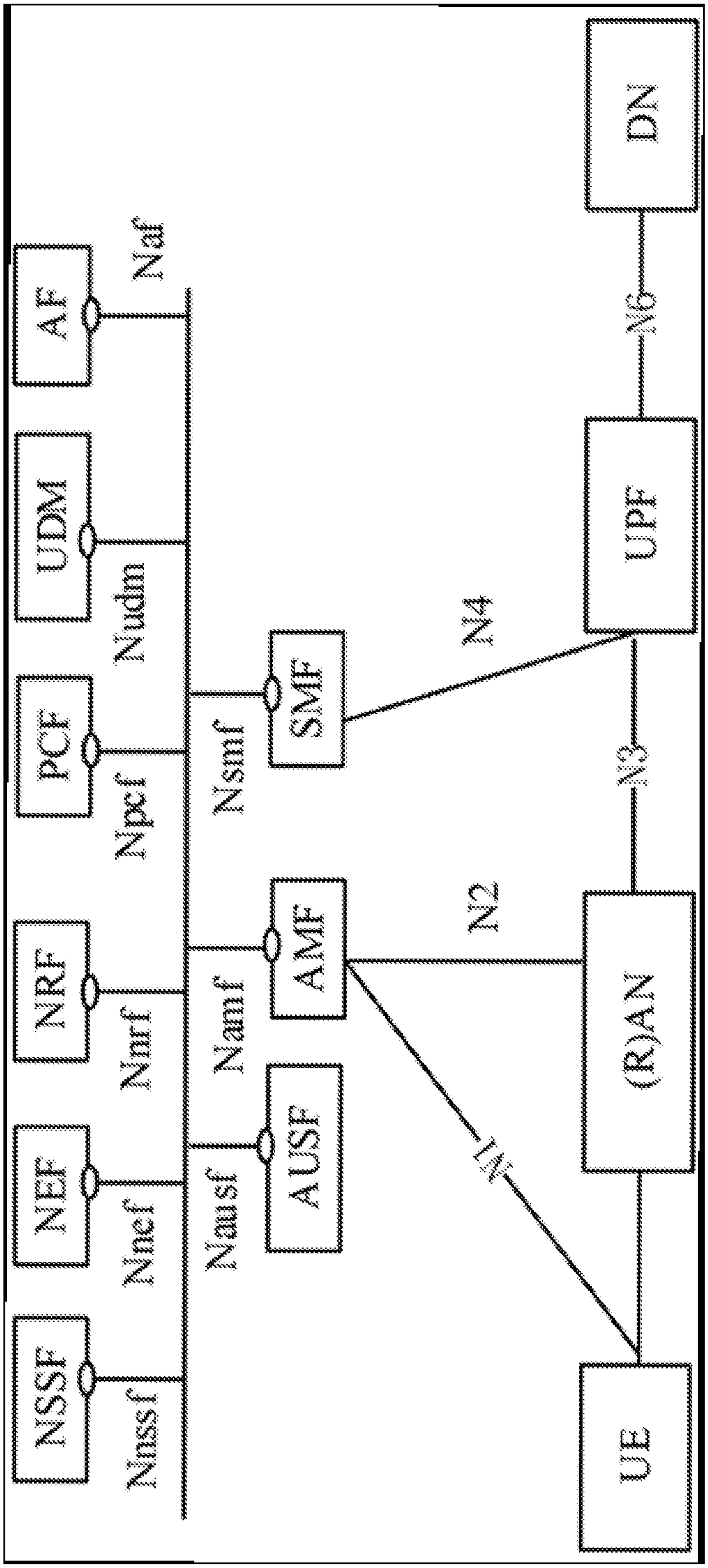
FIG. 3 is a block diagram illustrating a Service Based Architecture SBA of a 5G core network.
Figure 4:
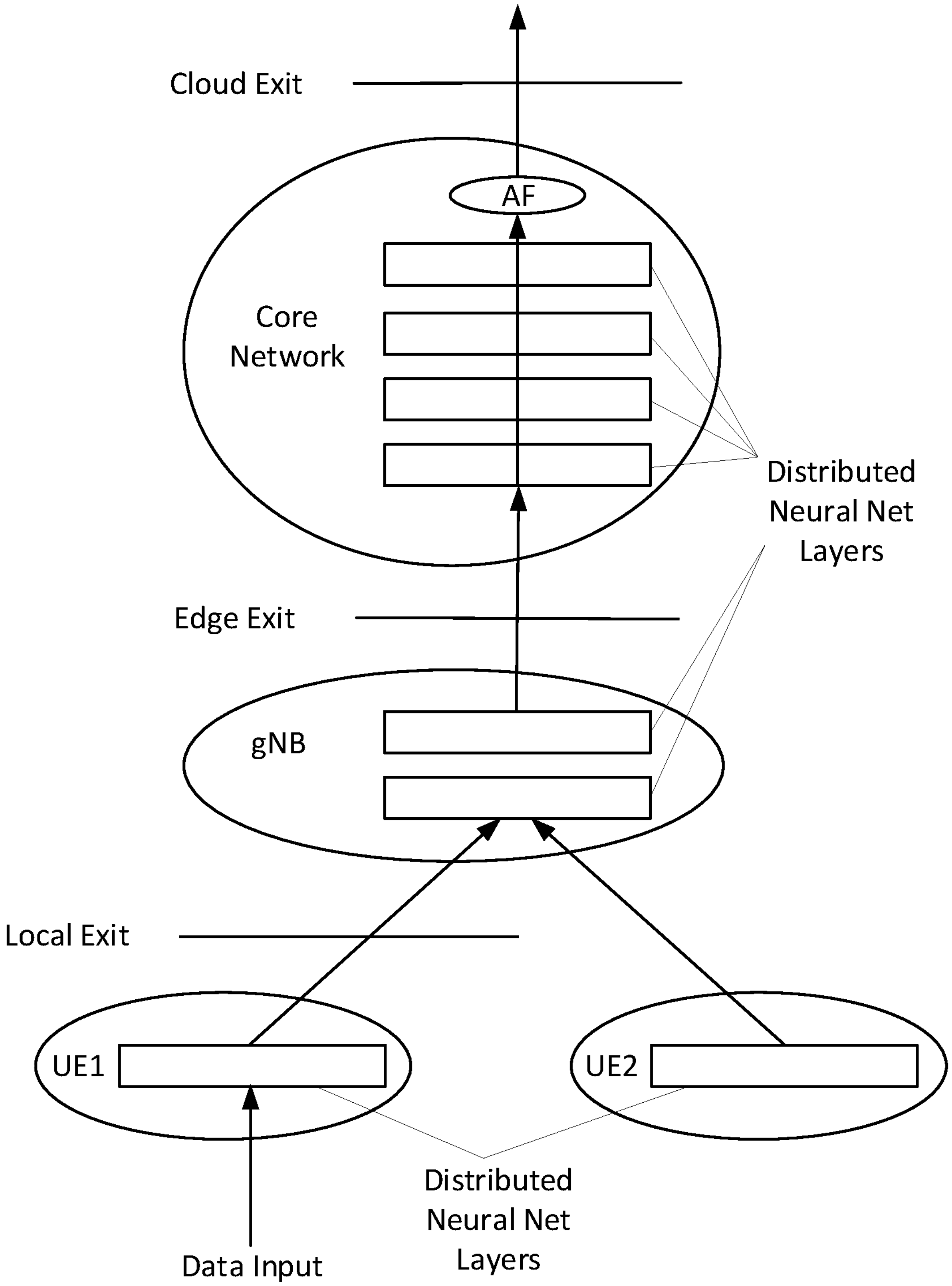
FIG. 4 is a diagram illustrating a DDNN architecture in a 3GPP network according to some embodiments of inventive concepts.

FIG. 4 illustrates an example of a DDNN Architecture in a 3GPP Network (service-based system architecture) according to some embodiments of inventive concepts.

The MDM could be generated by an application server AS and provided to the network via an AF. According to some embodiments, the application server may interact with a NEF via an Application Function (AF). Multiple application servers could share the same AF. Furthermore, MDM generation could be done within the AF. The MDM could be considered to be used by the network as an input to build a Service Level Agreement SLA or a network slice template for distributed AI architectures which is then enforced to functions of the core network CN. The MDM could be also considered by the network as an “intent” used by the application server to ask for a particular type of distributed AI deployment.

For a specific AI model, the above information could be dynamic and will be continuously updated for further deployment modification when the network environment changes. If any KPIs (or aggregated KPIs) are degraded below the thresholds, the network could trigger a re-organization of the deployment topology, traffic priorities, QoS management, computation capabilities, etc. This means that, in the present disclosure, the network (e.g., NWDAF) may be extended to provide additional analytics with respect to those standardized in 5G, i.e., the new analytics are Local accuracy and inference time (LAI), Edge accuracy and inference time (EAI), Cloud accuracy and inference time (CAI), Individual accuracy and inference time (IAI), potentially with associated KPI trigger threshold and in-advance trigger time. And request to update the static part of MDM. Detailed sequence/message diagrams are discussed below with respect to FIGS. 5A and 5B and FIGS. 6A and 6B (where FIGS. 5A and 5B, and FIGS. 6A, 6B, and 6C show an application server interacting with a mobile core network CN, and where such interaction could happen via an AF to which the application server is associated).

Figure 5A:
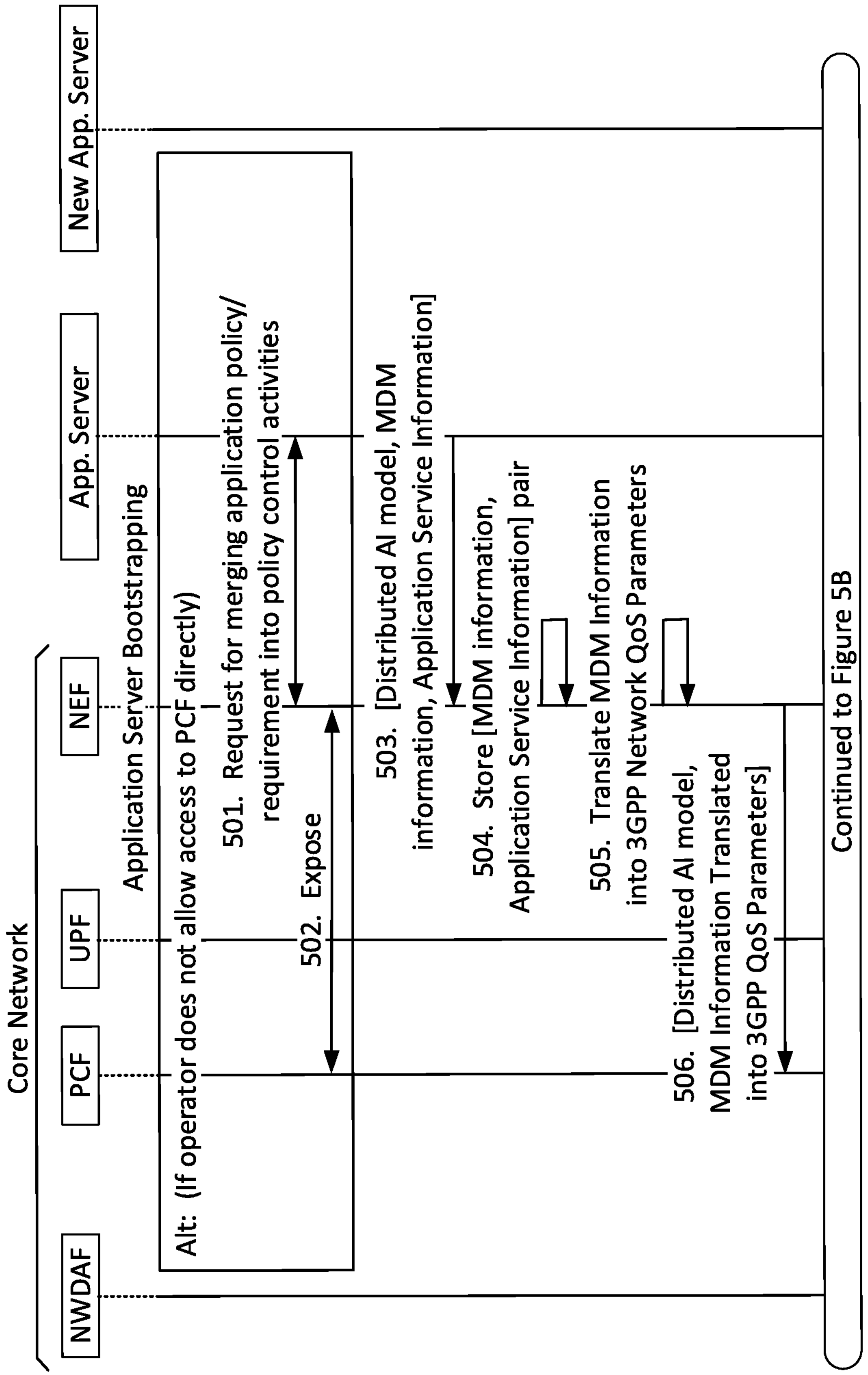
FIGS. 5A and 5B provide a message diagram illustrating network operations/messages during a bootstrapping phase according to some embodiments of inventive concepts.
Figure 5B:
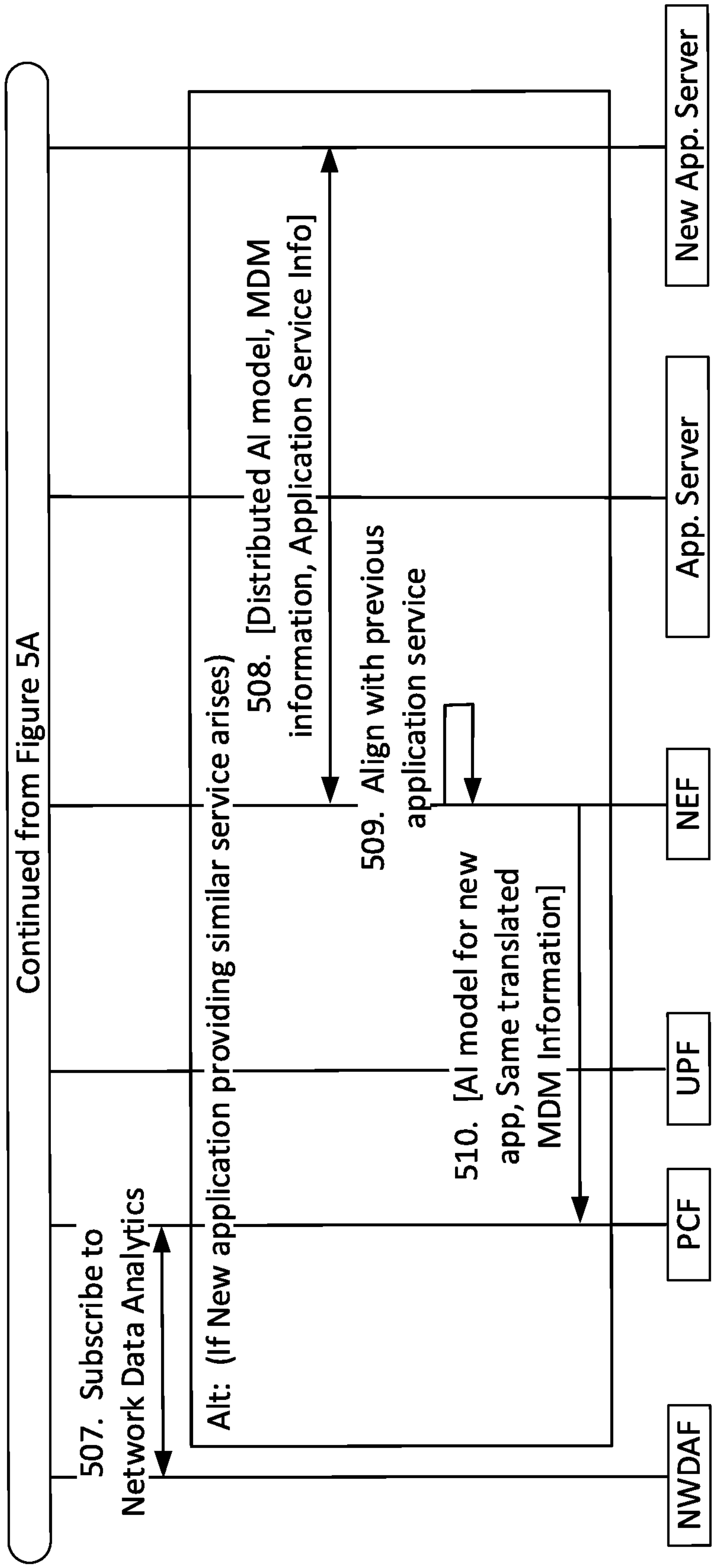

FIGS. 5A and 5B provide a message/sequence Diagram as applied, for example, to a 5G network for an Application Server Bootstrapping Phase. In FIGS. 5A and 5B, each of the NWDAF, PCF, UPF, and NEF may be respectively provided as a core network node including a network interface 1307, a processor 1303, and memory 1305 as discussed above with respect to core network node 1300 of FIG. 13, such that communications between two different core network nodes may be provided through respective network interfaces.

In the bootstrapping phase of FIGS. 5A and 5B, the network should expose the network features (e.g., RAN deployment situations in some geographic area, edge server deployments, their computing abilities, etc.) to the application server AS of machine learning ML at operations 501 and 502, through the network exposure function NEF. The application server can then use that information to choose good deployment options and derive initial MDM information. Once the MDM has been prepared, the application server could provide it to the NEF at operation 503, and the NEF can store the MDM information and Application Service Information at operation 504. At operation 505, the NEF can then translate the MDM parameters into 3gpp QoS parameters and provide the translated version of MDM to the PCF via NEF translation at operation 506. In such embodiments, the NEF may act as a translation node in embodiments where the network operator does not allow access to the PCF directly by an Application Server. In some other embodiments where the network operation does allow access to the PCT directly by an Application Server, operations of the translation node may be integrated at another core network node such as a PCF.

In the message diagram of FIGS. 5A and 5B, the following operations may be performed with the NEF acting as a translation node.

Operation 501: If the network operator does not allow access to the PCF directly by an Application Server, the NEF (acting as the translation node) may process a request from the Application Server to merge application policy and/or requirement information into policy control activities.

Operation 502: If the network operator does not allow access to the PCF directly by an Application Server, the PCF may expose its services to the NEF (acting as the translation node).

Operation 503: The NEF (acting as the translation node) receives a distributed AI model, MDM information, and application service information (e.g., input data size, potential bandwidth requirement, etc.) from the Application Server.

Operation 504: The NEF stores the MDM information aligned with the provided application service information from Operation 3, and this stored information may be used to identify similar application service vendors, if any should arise in the future.

Operation 505: The NEF translates the MDM information with the aligned application service information to 3GPP QoS requirements, which may include [LAI, EAI, IAI, KPI trigger Threshold, In-advance trigger time, etc.]. For example, for a given LAI, EAI, and IAI, there could be 5G QoS Identifiers 5QIs to be used for corresponding traffic flows. In addition, computation requirement for the UPF or for an intermediate network node may be generated which are used by the SMF to choose UPFs or to steer DDNN traffic.

Operation 506: The NEF transmits the received AI model, with translated 5QIs and computation requirement to the PCF. (Optionally, the NEF can maintain the distributed AI model, and only transmit the translated 5QIs and computation requirements to the PCF.)

Operation 507: the UPF Subscribes to Network Data Analytics.

Operation 508: In the event that a new application service with a similar function arises (e.g., Messager and What's App's friends recommendation service) from a new Application Server, the NEF (acting as the translation node) receives the distributed AI model, the MDM information, and application service information from the new Application Server.

Operation 509: The NEF aligns the MDM information of operation 508 with the existing application service based on the similar service feature information, and based on the information stored at operation 504.

Operation 510: The NEF reuses the same MDM 3GPP Network QoS parameters from operations 505 and 506 for the new Application Server, and transmits the AI model of operation 508 with the translated 5QIs and computation requirements of operations 505 and 506 to the PCF. (Optionally, the NEF can maintain the distributed AI model of operation 508, and only transmit the translated 5Qis and computational requirements to the PCF.)

Figure 6A:
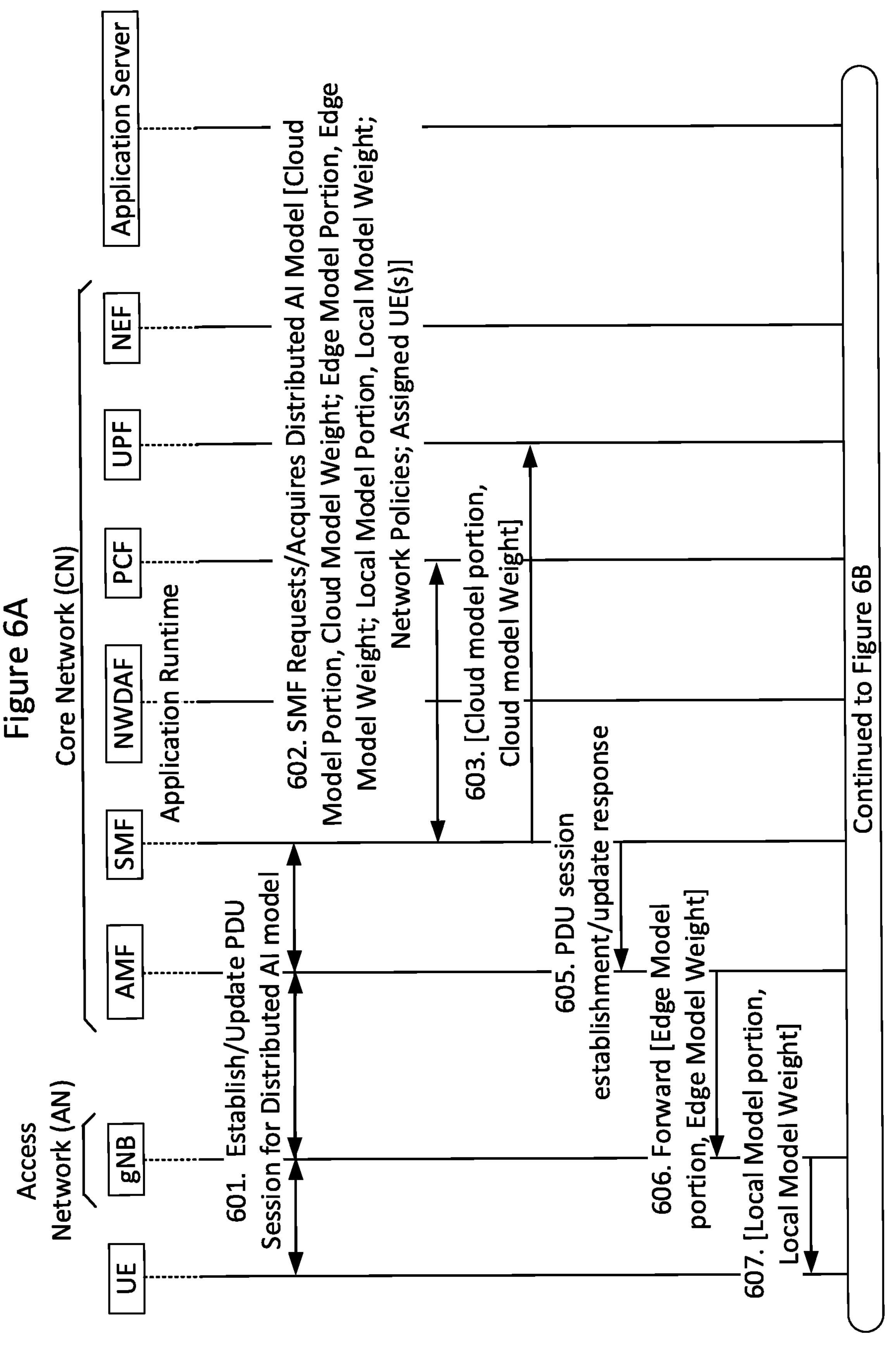
FIGS. 6A, 6B, and 6C provide a message diagram illustrating network operations/messages during an application runtime phase according to some embodiments of inventive concepts.
Figure 6B:
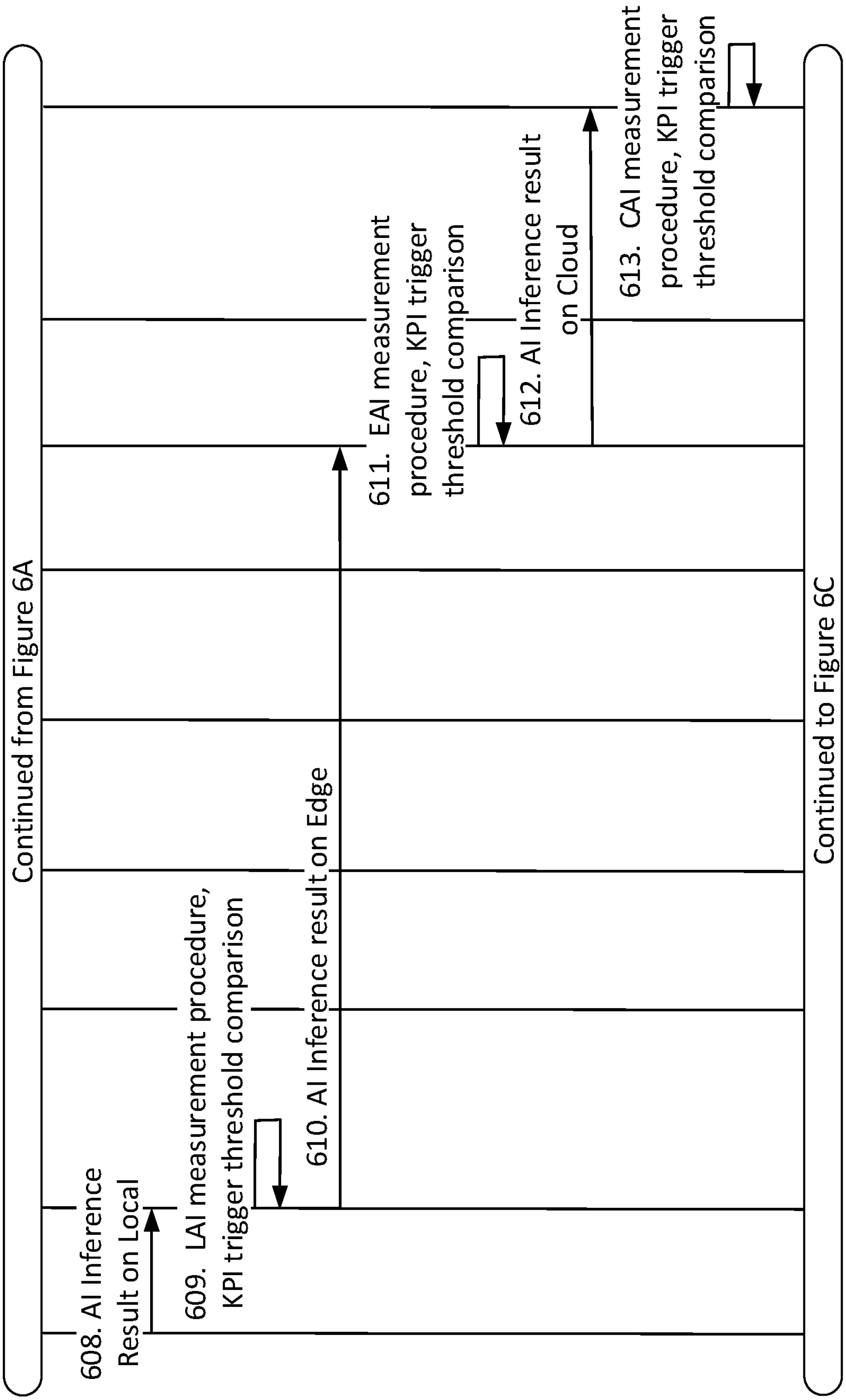
Figure 6C:
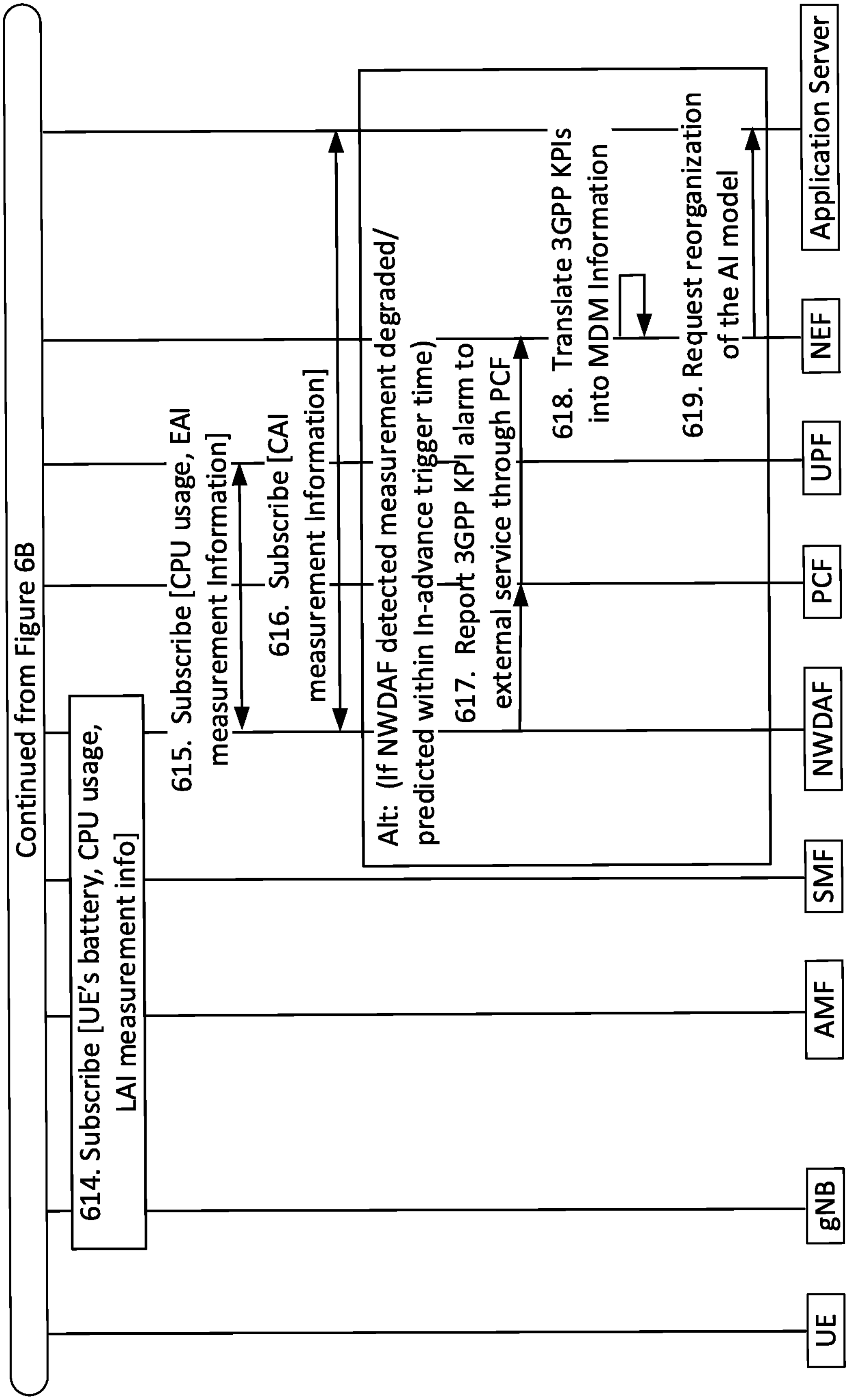

FIGS. 6A, 6B, and 6C provide a message/sequence Diagram as applied, for example, to a 5G network for an Application runtime Phase for an Application Server.

Once a UE is attached and its AI application is initialized (ref FIG. 6), a PDU session is established to connect the Access Network AN (e.g., Radio Access Network RAN) to the Core Network CN, carrying the QoS information which would be further distributed to the network. During interaction with the PCF (according to the QoS information, the UE capability and MDM information), the edge portion of model will be distributed to the Access network (AN) and further a local portion can be assigned to the UE.

In the Core Network, after the PCF policies are delivered, a series of UPFs is constructed, carrying the cloud portion of the machine learning ML model and performing inferencing when rerouting user plane traffic.

Meanwhile, the Network Data Analytic Function NWDAF will collect traffic statistics for the DDNN traffic and UE/network capabilities and update the MDM dynamic part in the PCF. If some Key Performance Indicators KPIs are degraded lower than a threshold, The NWDAF will interreact with the PCF (and if in-advance trigger time is specified, the NWDAF will trigger such interaction based upon prediction) and further, an interface through the NEF with the external application server may be used to update the MDM deployment information (static part).

In the message diagram of FIGS. 6A, 6B, and 6C, the following operations may be performed with the NEF acting as a translation node.

Operation 601: The UE attaches and triggers an AI application/model, and the UE transmits a request for a distributed AI model through the AMF to the SMF. Accordingly, a PDU session may be specially established/updated for the distributed AI model based on communications between the UE and the SMF (through the AMF).

Operation 602: The SMF requests/acquires the DDNN deployment information from the PCF. Alternatively, such deployment information can also be acquired from the AF or the NEF. The DDNN deployment information (also referred to as the Distributed AI model) includes: [Cloud model portion, Cloud model weight], [Edge model portion, Edge model weight, network policies, Assigned UEs], and [Local model portion, Local model weight].

Operation 603: The SMF, according to deployment information from the PCF (received at operation 602), spreads portions of the distributed AI model and the corresponding weight(s) to one or more UPFs. As shown in FIG. 6A, the SMF transmits cloud model portions of the AI model (i.e., [Cloud model portion, Cloud model weight]) to the UPS(s).

Operation 605: The SMF, according to deployment information from the PCF (received at operation 602), spreads portions of the distributed AI model and the corresponding weights to the AMF (for further distribution to the access network and UE as discussed below with respect to operations 606 and 607). As shown in FIG. 6A, the SMF may transmit a PDU session establishment/update response message to the AMF, and the PDU session establishment/update response message may include edge model portions of the AI model (i.e., [Edge Model portion, Edge model weight]) and local model portions of the AI model (i.e., [Local Model portion, Local model weight]). The deployment can thus be conducted using the PDU session specially established for the distributed AI service.

Operation 606: The AMF forwards the edge model portions of the AI model (i.e., [Edge Model portion, Edge model weight]) and local model portions of the AI model (i.e., [Local Model portion, Local model weight]) to a node of the access network (e.g., to a gNB).

Operation 607: The AN node (e.g., gNB) forwards the local model portions of the AI model (i.e., [Local Model portion, Local model weight]) to the UE. To differentiate MDM related data traffic from other mobile traffic, a different IP address/prefix may be allocated to the UE (e.g., an IPv6 multi-homing address) for the traffic of the distributed AI application.

Operation 608: The UE generates a local AI inference result based on the local model portions of the AI model (i.e., [Local Model portion, Local model weight]) and transmits the local AI inference result to the AN node (e.g., to the gNB).

Operation 609: The AN node (e.g., gNB) performs an LAI translated-MDM QoS KPI measurement procedure based on the local AI inference result of operation 608 and based on a KPI trigger threshold comparison and/or in-advance trigger time.

Operation 610: The AN node transmits an edge inference result to the UPF based on the LAI translated-MDM QoS KPI measurement procedure, the KPI trigger threshold comparison, and/or the in-advance trigger time of Operation 609.

Operation 611: The UPF performs an EAI translated-MDM QoS KPI measurement procedure based on the edge AI inference result of operation 610 and based on a KPI trigger threshold comparison and/or in-advance trigger time.

Operation 612: The UPF transmits a cloud AI inference result to the application server based on the EAI translated-MDM QoS KPI measurement procedure, the KPI trigger threshold comparison, and/or the in-advance trigger time of operation 611.

Operation 613: The Application Server performs a CAI translated-MDM QoS KPI measurement procedure based on the cloud AI inference result of operation 612 and based on a KPI trigger threshold comparison and/or in-advance trigger time.

Operation 614: The AN node (e.g., gNB) and the NWDAF share subscriber UE information (e.g., including UE battery charge, UE CPU usage, LAI measurement information, etc.).

Operation 615: The NWDAF and the UPF share subscriber UE information (e.g., including UE CPU usage, and EAI measurement information).

Operation 616: The Application Server and the NWDAF share subscriber UE information (e.g., CAI measurement information from operation 613).

Operation 617: Responsive to NWDAF detecting or predicting (with in-advanced trigger time) a degradation of network QoS KPIs (e.g., based on EAI and/or CAI measurement information) relative to respective KPI trigger thresholds, the NWDAF notifies the PCF and submits to NEF, where PCF confirms a re-organization of the deployment. As shown, the NWDAF may transmit the notification as a 3GPP KPI alarm to the NEF via the PCF.

Operation 618. The NEF translates the received KPI alarm into MDM information.

Operation 619. The NEF transmits a request for re-organization of the AI model to the application server/AF.

Considering operation 619, different network functions can subscribe to retrieve analytics and/or predictions on model performance KPIs from the NWDAF. As an example, an SMF may subscribe to such analytics and/or predictions from the NWDAF and use such information to trigger network adaptations such as UPF re-location.

A PDU session setup procedure for DDNN is discussed below with respect to FIG. 7.

Figure 7:
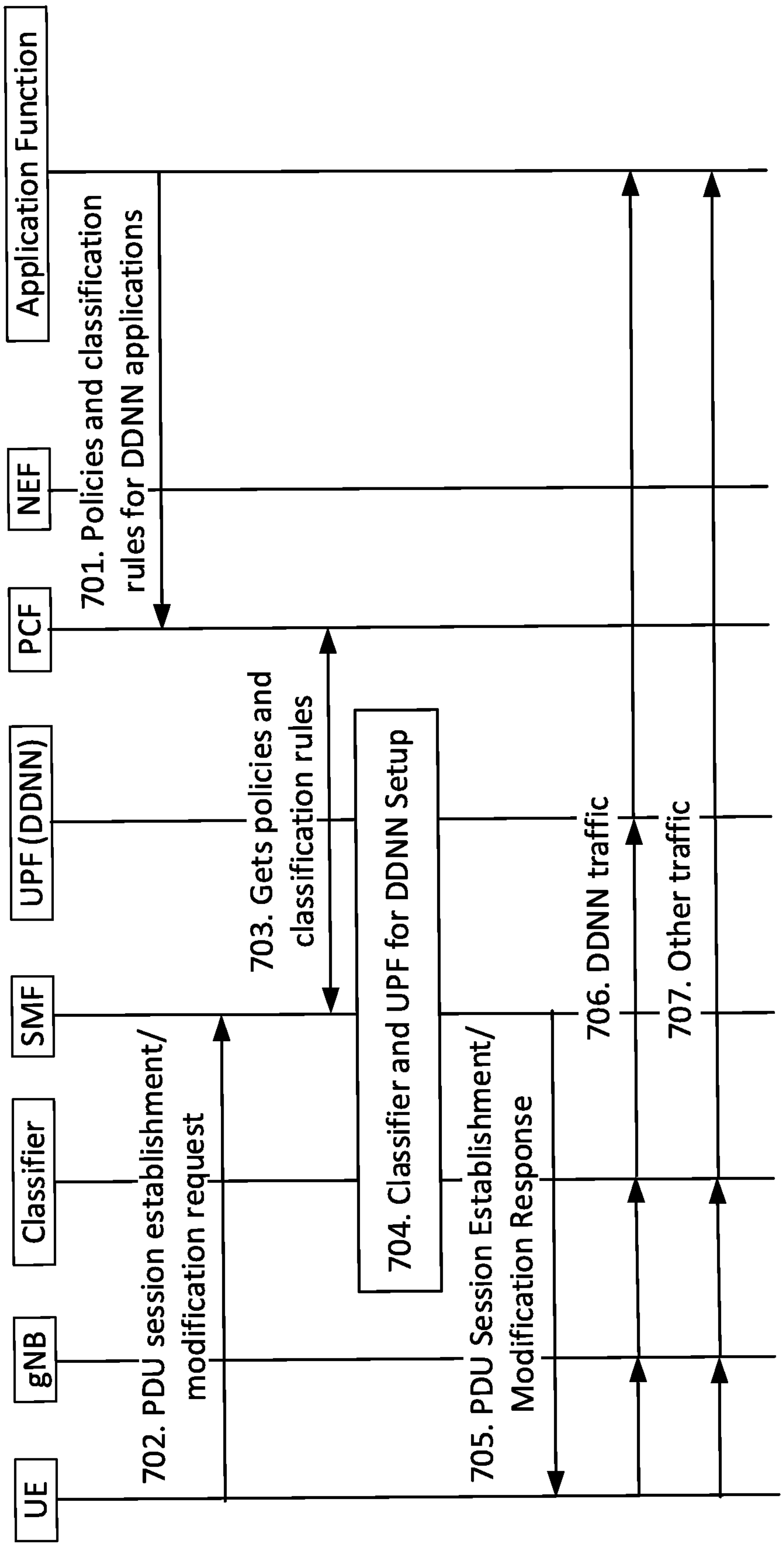
FIG. 7 is a message diagram illustrating operations/messages to set up a classifier and a UPF for DDNN application data traffic according to some embodiments of inventive concepts.

FIG. 7 illustrates the procedure of setting up the CL (classifier) as well as the UPF for DDNN application data traffic. In operation 701, the policies and MDM are provisioned from AF to PCF via NEF. The policies and MDM are discussed above. When the UE tries to establish or modify a PDU session for the DDNN application, the UE can mention the service type (or application type) in the corresponding request at operation 702. The SMF chooses the UPF according to the policies received from the PCF at operation 703. The UPF will deploy, for example, cloud model/layer and weights for the DDNN. In addition, in operation 704, the SMF will provide the classification rules to the classifier. The DDNN traffic can be classified by e.g. destination IP addresses, or source IP addresses (UE could use IPv6 multihoming), application flow description (either explicit or implicit) that may be a Server Name Indication SNI or a 5-Tuple. At operation 705, SMF may transmit a PDU Session Establishment/Modification Response to the UE (responsive to the PDU Session Establishment/Modification Request of operation 702). At operation 706, the UE can transmit DDNN traffic through gNB, Classifier, and UPF to the Application Function, and at operation 707, the UE can transmit other traffic through gNB and Classifier to the Application function.

Figure 8A:
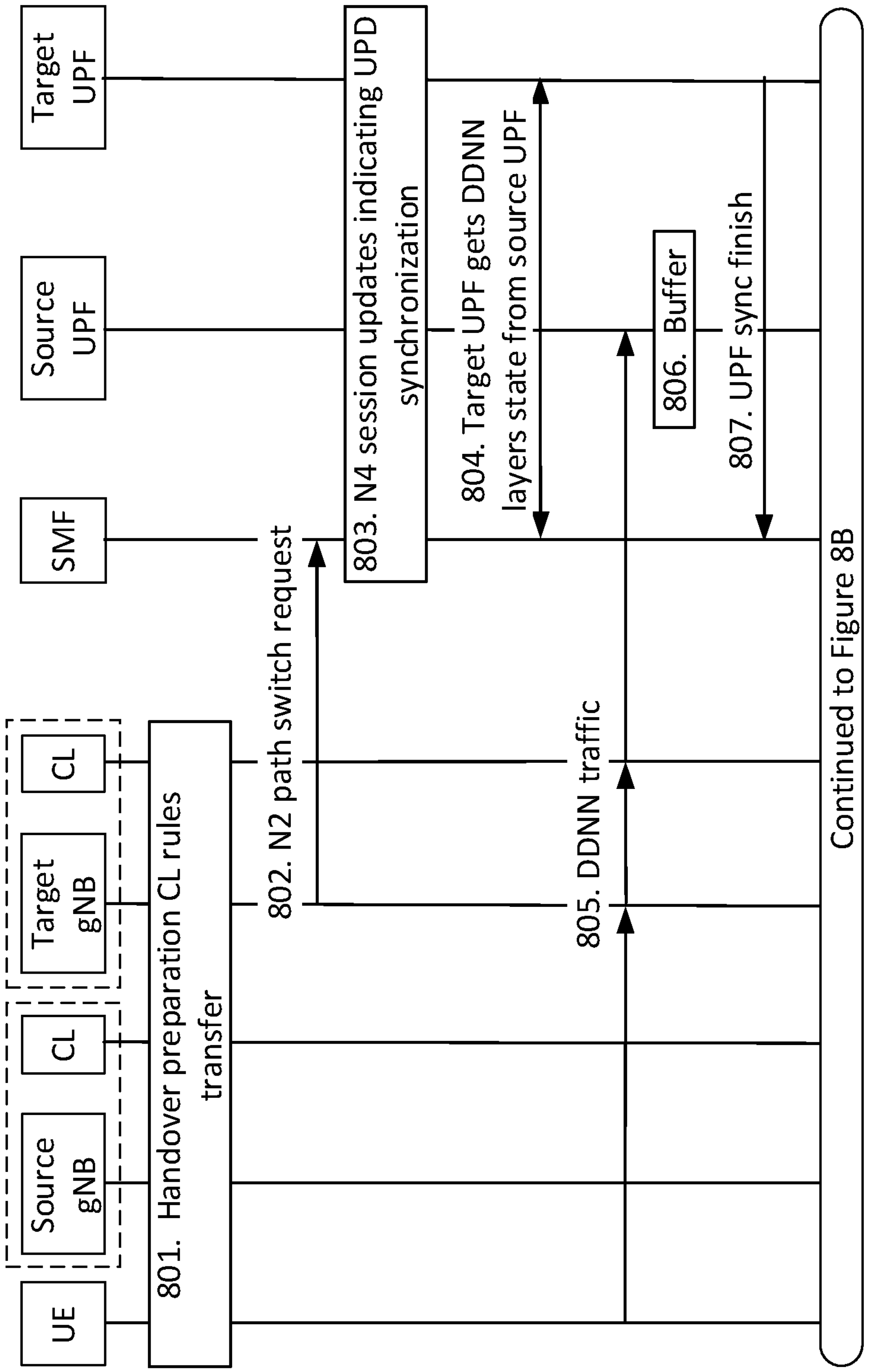
FIGS. 8A and 8B provide a message diagram illustrating operations/messages during handover with UPF relocation for DDNN according to some embodiments of inventive concepts.
Figure 8B:
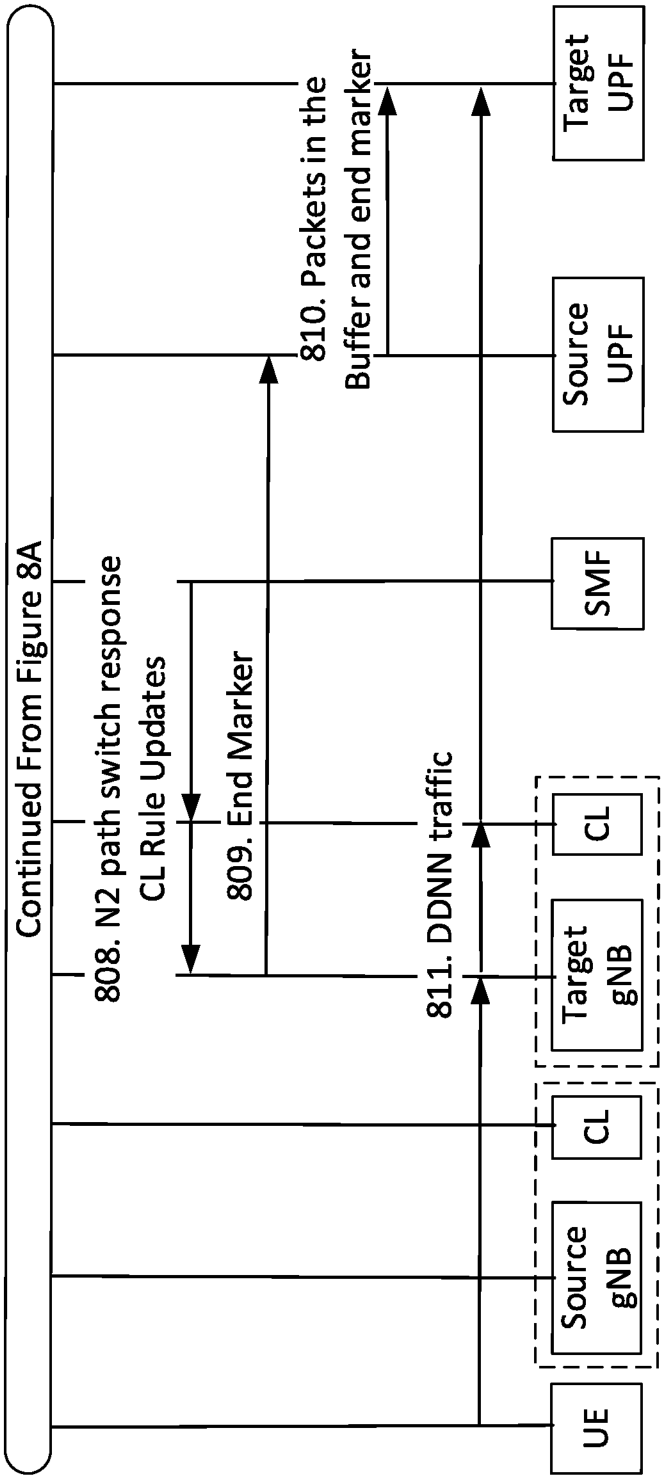

Handover with UPF relocation for DDNN is discussed below with respect to FIG. 8.

The handover procedure is similar to that of TS23.502 with differences discussed below.

As a difference, a respective classifier is assumed to be beside or even inside each gNB.

As another difference in operation 801, the classifier of the source gNB transfers the classification rules to the classifier in the target gNB.

As still another difference in operation 803, SMF will setup/configure the target UPF using the policies for DDNN traffic and will coordinate the synchronization between target UPF and the source UPF, e.g. give the IP address of target UPF to the source UPF and vice versa. In operation 803, the target UPF is selected considering that the target UPF is selected to fulfil the related model performance KPIs.

As yet another difference in operation 804, the source UPF transfers the DDNN layer state to the target UPF. For example, the state is the historical learning results if DDNN is used for predictions.

Figure 9:
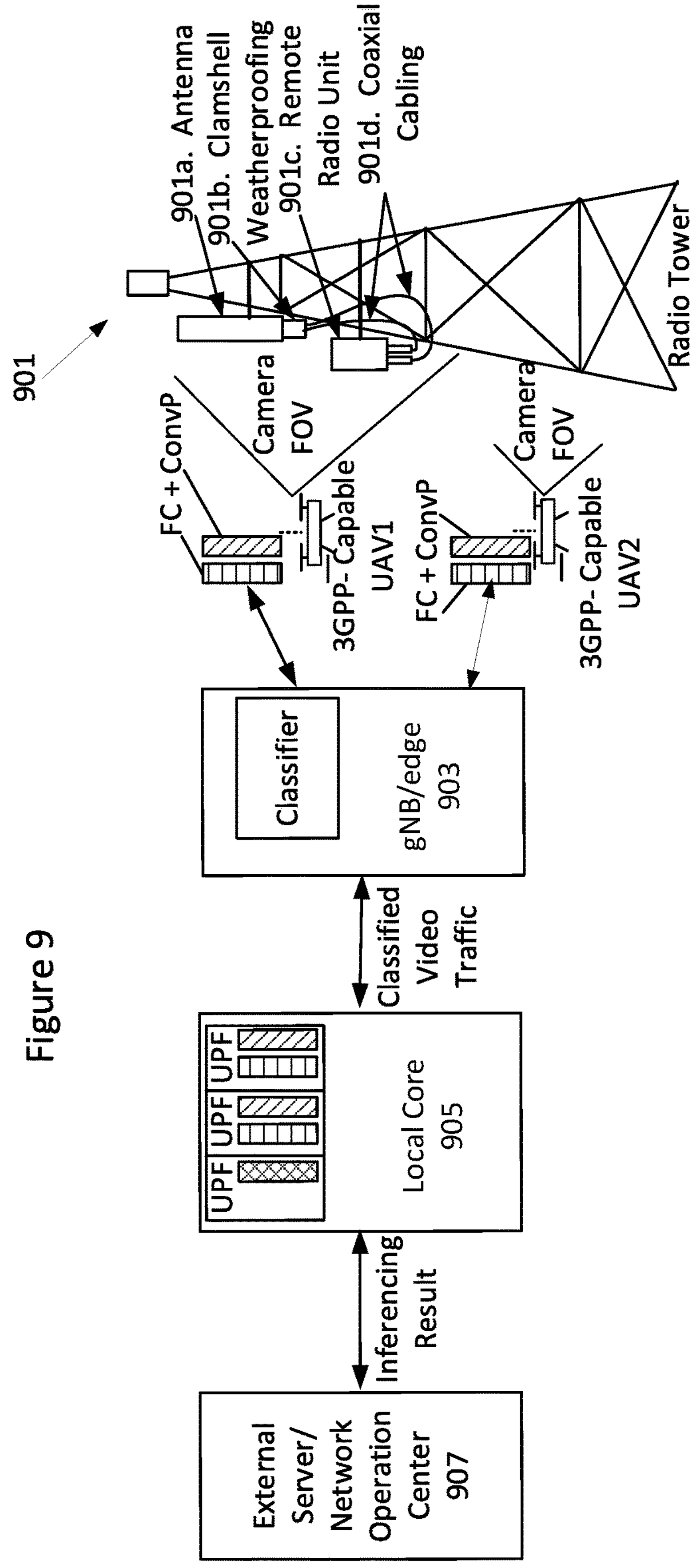
FIG. 9 is a block diagram illustrating UAV assisted automated tower inspection in a DDNN deployment according to some embodiments of inventive concepts.

FIG. 9 illustrates a UAV assisted automated tower inspection under a DDNN deployment according to some embodiments of inventive concepts. An example of an application in which embodiments of inventive concepts may be implemented, is Computer Vision assisted Drone tower inspection as illustrated in FIG. 9. For example, radio tower 901 may include antenna 901*a*, clamshell weatherproofing 901*b*, remote radio unit 901*c*, and/or coaxial cabling 901*d*.

Site roll-out for a base station tower is labor-intensive and risky work and an approach has been developed using a 3GPP-managed/capable Unmanned Arial Vehicle (UAV) and computer vision technologies to provide automated site inspection. Due to a potentially constrained computation environment on a UAV, a DDNN deployment for this ML model in a 3GPP network may be useful for multiple reasons.

During the ML model design, a site installation may have highly geographical localized requirements. One could not expect to have a 'global model' on the cloud to process/examine all the installation statues maintained by different vendors across different locations. One approach is to maintain this knowledge on the local device/personal level, on the principle of a 'good installation'. Yet, keeping some shallow layers on the device level could help to capture these small differences between different site configurations. Thus, the overall DDNN performance may be much better than a global DNN model on the cloud.

Figure 10:
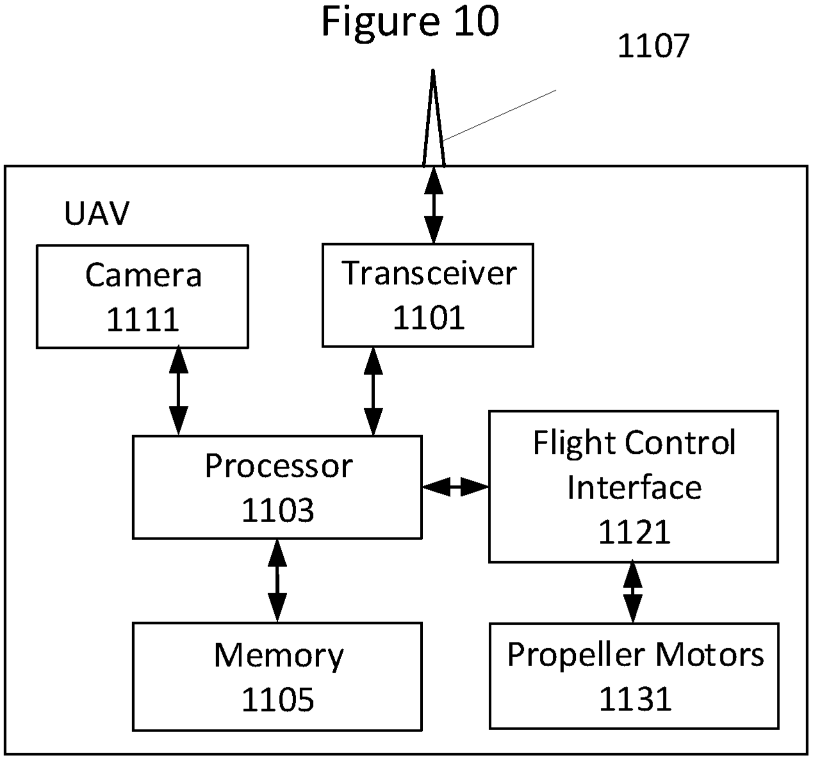
FIG. 10 is a block diagram illustrating a UAV of FIG. 9 according to some embodiments of inventive concepts.

During implementation, a drone's computing capability may be limited and/or power-consumption sensitive. Thus, the MDM may designate that the computation-heavy component of the DDNN be mostly deployed on cloud (e.g., local core). With shallower components deployed close to the serving area, on the one hand, this may limit the UAV to using only the computation in a neighboring cell that could be eligible to perform the detection, without leaking such information outside the serving areas. On the other hand, a shallower neural network may be better at capturing small feature regions (e.g., strait edge, turning, etc. in certain image channels), which may turn out to be a more reliable feature in some/most cases. Thus, the model performance can be boosted using an MDM indicating different/localized UE and edge weight(s), while having a shared cloud component. As shown in FIG. 10, each of 3GPP-managed/capable unmanned aerial vehicles UAV1 and UAV2 of FIG. 9 (acting as respective end devices/nodes of the network) may be provided as discussed above with respect to FIG. 11 regarding UE 1100 including a transceiver 1101, processor 1103, and memory 1105. In addition, a UAV of FIGS. 9 and 10 may include a respective camera 1111 used to take still/video images of radio tower 901 (over respective Fields of View FOV), propeller motors 1131 used to provide lift/control for the UAV, and a flight control interface 1121 providing control of the propeller motors 1131 based on input from processor 1103. According to some embodiments, processor 1103 may control flight of the UAV based on remote instructions received through transceiver 1101 via network communication and/or based on remote instructions received directly from a remote controller independent of network communication.

Moreover, processor 1103 may receive still/video images from camera 1111, and processor 1103 may transmit the still/video images and/or inferences relating to the still/video images (e.g., generated using light FC and/or ConvP layers of the DDNN based on the MDM) through transceiver 1101 over the radio interface to a base station gNB 903 (acting as an edge device/node of the network) as shown in FIG. 9. In FIG. 9, FC layers of the DDNN are illustrated using horizontal hatching, and ConvP layers are illustrated using diagonal hatching. According to some embodiments, each of UAV1 and/or UAV2 of FIG. 9 may operate as discussed above with respect to UE1/UE2 of FIG. 4, the UE of FIGS. 6A, 6B, and 6C, the UE of FIG. 7, and/or the UE of FIGS. 8A and 8B.

The base station gNB 903 may be provided as discussed above with respect to the RAN node 400 of FIG. 12. A classifier may be implemented by processor 403, and processor 403 may provide aggregation of the inferencing result(s) from DDNN Traffic classification between FC/ConvP light layers on the UAVs and the UAV processed video flow. As shown in FIG. 9, processor 403 of base station gNB 903 may provide the classified still/video image traffic (including inferences) through network interface 407 to core network node 905. According to some embodiments, base station gNB 903 of FIG. 9 may operate as discussed above with respect to the gNB of FIG. 4, the gNB of FIGS. 6A, 6B, and 6C, the gNB of FIG. 7, and/or either the source or target gNB of FIGS. 8A and 8B.

The core network node 905 may be provided as discussed above with respect to the core network node 1300 of FIG. 13. As shown in FIG. 9, core network node 905 may receive the classified video traffic from base station gNB 903 through network interface 1307. Further deeper layers (FC indicated with horizontal hatch and ConvP indicated with diagonal hatch) and output Layer (indicated with crosshatch) of the DDNN may be performed by processor 1303 of core network node 905. As shown in FIG. 9, an inferencing result from the DDNN output layer may be transmitted by processor 1303 through network interface 1307 to the external server and/or network operation center 907 as shown in FIG. 9. According to some embodiments, core network node 905 may operate as discussed above with respect to a node of the core network of FIG. 4, the UPF of FIGS. 5A and 5B, the UPF of FIGS. 6A, 6B, and 6C, the UPF of FIG. 7, and/or the source/target UPF of FIGS. 8A and 8B.

According to some embodiments of FIG. 9, for example, computer vision assisted drone tower inspection may be able to distinguish between different site installations of radio towers from different site maintenance vendors, for example, distinguishing between connectors using tape and using Rubber tube that are similar in color and/or shape.

According to some embodiments of inventive concepts, network functions in a core network of service-based network architecture (e.g., 5G and beyond systems) may be enabled to use MDM information to deploy a distributed AI model and boost model performance.

According to some embodiments of inventive concepts, approaches may be provided to forward the DDNN traffic to corresponding entities in the mobile network.

According to some embodiments of inventive concepts, approaches for handover in a DDNN application may be provided.

Operations of a translation node (implemented using the structure of Core Network Node 1300 of FIG. 13) will now be discussed with reference to the flow chart of FIG. 14 according to some embodiments of inventive concepts. For example, modules may be stored in memory 1305 of FIG. 13, and these modules may provide instructions so that when the instructions of a module are executed by respective CN node processing circuitry 1303, processing circuitry 1303 performs respective operations of the flow chart.

Operations of blocks 1401 and 1402 may be performed if the network operator does not allow the Application Server to directly access the PCF. According to some embodiments at block 1401, processing circuitry 1303 receives a request (from a first Application Server through network interface 1307) to merge application policy/requirement into policy control activities, and according to some embodiments at operation 502, the PCF exposes its capability/presence to processing circuitry 1303 (through network interface 1307). Operations of blocks 1401 and 1402 may be performed, for example, as discussed above with respect to operations 501 and 502 of FIG. 5A.

According to some embodiments at block 1403, processing circuitry 1303 receives (from the first Application Server through network interface 1307) first application service information for a first application service, a first distributed Artificial Intelligence AI model for the first application service, and first Model Deployment Map MDM information for the first application service. Operations of block 1403 may be performed, for example, as discussed above with respect to operation 503 of FIG. 5A. For example, the first application service information may include at least one of a first input data size for the first application service and/or a first potential bandwidth requirement for the first application service.

According to some embodiments at block 1404, processing circuitry 1303 stores (in memory 1305) the first MDM information for the first application service in association with the first application service information for the first application service. Operations of block 1404 may be performed, for example, as discussed above with respect to operation 504 of FIG. 5A.

According to some embodiments at block 1405, processing circuitry 1303 translates the first MDM information for the first application service into network Quality of Service QoS parameters for the first application service. Operations of block 1405 may be performed, for example, as discussed above with respect to operation 505 of FIG. 5A. The network QoS parameters for the application service, for example, may include at least one of an individual accuracy and inference time IAI for the AI model, a local accuracy and inference time LAI for the AI model, an edge accuracy and inference time EAI for the AI model, and/or a cloud accuracy and inference time CAI for the AI model. In addition, the network QoS parameters may include a trigger threshold associated with at least one of the IAI, LAI, EAI, and/or CAI, wherein the trigger threshold defines a value of at least one of the IAI, LAI, EAI, and/or CAI that is used to trigger an adaptation of the AI model, and/or the network QoS parameters may include an in-advance trigger time wherein the in-advance trigger time is used to trigger an adaptation of the AI model in advance of the at least one of the IAI, LAI, EAI, and/or CAI satisfying the trigger threshold.

According to some embodiments at block 1406, processing circuitry 1303 provides the first distributed AI model (through network interface 1307) with the network QoS parameters for distribution to at least one other node of the communication network (e.g., the NEF transmits the first distributed AI model with the network QoS parameters to the PCF). Operations of block 1406 may be performed, for example, as discussed above with respect to operation 506 of FIG. 5A. For example, providing the first distributed AI model with the network QoS parameters may include transmitting the first distributed AI model with the network QoS parameters to a policy control function PCF node of the communication network.

Operations of blocks 1408, 1409, and 1410 may be performed if a second (new) application server provides a second application service that is similar to the first application service of the first application server. According to some embodiments at block 1408, processing circuitry 1303 receives (through network interface 1307) second application service information for the second application service (from the second/new application server), a second distributed AI model for the second application service, and second MDM information for the second application service. Operations of block 1408 may be performed, for example, as discussed above with respect to operation 508 of FIG. 5B. For example, the second application service information may indicate at least one of a second input data size for the second application service and/or a second potential bandwidth requirement for the second application service According to some embodiments at block 1409, processing circuitry 1303 aligns the network QoS parameters for the first application service with the second application service responsive to a similarity between the first application service information and the second application service information. Operations of block 1409 may be performed, for example, as discussed above with respect to operation 509 of FIG. 5B. For example, processing circuitry 1303 may align the network QoS parameters for the first application with the second application service responsive to a similarity between the first and second input data sizes and/or responsive to a similarity between the first and second potential bandwidth requirements.

According to some embodiments at block 1410, processing circuitry 1303 provides (through network interface 1307) the second distributed AI model with the network QoS parameters for distribution to the at least one other node of the communication network (e.g., the NEF transmits the second distributed AI model with the network QoS parameters to the PCF). Operations of block 1410 may be performed, for example, as discussed above with respect to operation 510 of FIG. 5B. For example, providing the second distributed AI model with the network QoS parameters may include transmitting the second distributed AI model with the network QoS parameters to the policy control function, PCF, node of the communication network.

Moreover, the translation node may be integrated in a network exposure function NEF node of a core network and/or in a policy control function PCF node of the core network.

Figure 14:
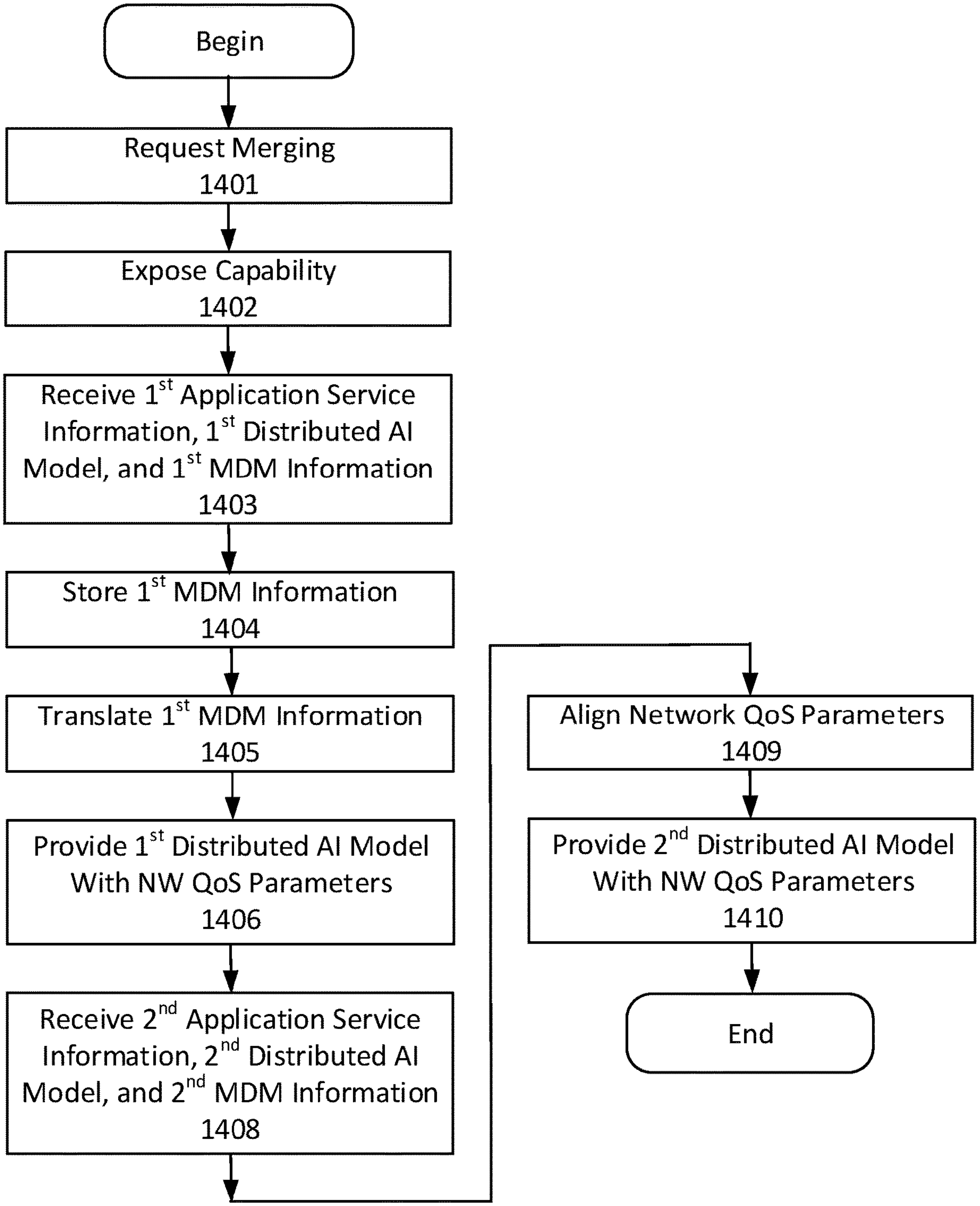
FIG. 14 is a flow chart illustrating operations of a translation node according to some embodiments of inventive concepts.

Various operations from the flow chart of FIG. 14 may be optional with respect to some embodiments of CN nodes and related methods. For example, operations of blocks 1401, 1402, 1404, 1407, 1408, 1409, and/or 1410 of FIG. 14 may be optional.

Operations of a Session Management Function, SMF, node (implemented using the structure of Core Network Node 1300 of FIG. 13) will now be discussed with reference to the flow chart of FIG. 15 according to some embodiments of inventive concepts. For example, modules may be stored in memory 1305 of FIG. 13, and these modules may provide instructions so that when the instructions of a module are executed by respective CN node processing circuitry 1303, processing circuitry 1303 performs respective operations of the flow chart.

According to some embodiments at block 1501, processing circuitry 1303 receives (through network interface 1307) a session request for a session for an AI service associated with the distributed AI model from the communication device. Operations of block 1501 may be performed, for example, as discussed above with respect to operation 601 of FIG. 6A. For example, the session request may include a request to establish and/or update the session for the distributed AI model, and/or the session for the distributed AI model may be a protocol data unit PDU session for the distributed AI model.

According to some embodiments at block 1502, processing circuitry 1303 acquires (through network interface 1307) a distributed artificial intelligence AI model for a communication device, wherein the distributed AI model includes a cloud model portion and a cloud model weight, an edge model portion and an edge model weight, and a local model portion and a local model weight. Operations of block 1502 may be performed, for example, as discussed above with respect to operation 602 of FIG. 6A. The distributed AI model may be acquired, for example, responsive to receiving the session request from the communication device. Moreover, acquiring the distributed AI model may include transmitting a request to a policy control function PCF node of the communication network responsive to receiving the session request for the distributed AI model, and receiving the distributed AI model from the PCF node.

According to some embodiments at block 1503, processing circuitry 1303 transmits (through network interface 1307) the cloud model portion and the cloud model weight to a user plane function UPF node of the communication network. Operations of block 1503 may be performed, for example, as discussed above with respect to operation 603 of FIG. 6A.

According to some embodiments at block 1505, processing circuitry 1303 transmits (through network interface 1307) the edge model portion and the edge model weight and the local model portion and the local model weight for distribution to a radio access network, RAN, node associated with the communication device. Operations of block 1505 may be performed, for example, as discussed above with respect to operation 605 of FIG. 6A.

According to some embodiments, transmitting the edge model portion and the edge model weight and the local model portion and the local model weight may include transmitting a session response for the session for the distributed AI model, wherein the session response is transmitted in response to the session request, and wherein the session response includes the edge model portion and the edge model weight and the local model portion and the local model weight. For example, the session response may be transmitted through an access and mobility function AMF node of the communication network to the RAN node associated with the communication node, and the session request may be received from the communication device through the RAN node and the AMF node. Moreover, the session response may include an Internet Protocol IP address to be allocated to the communication device for traffic of the distributed AI model.

Figure 15:
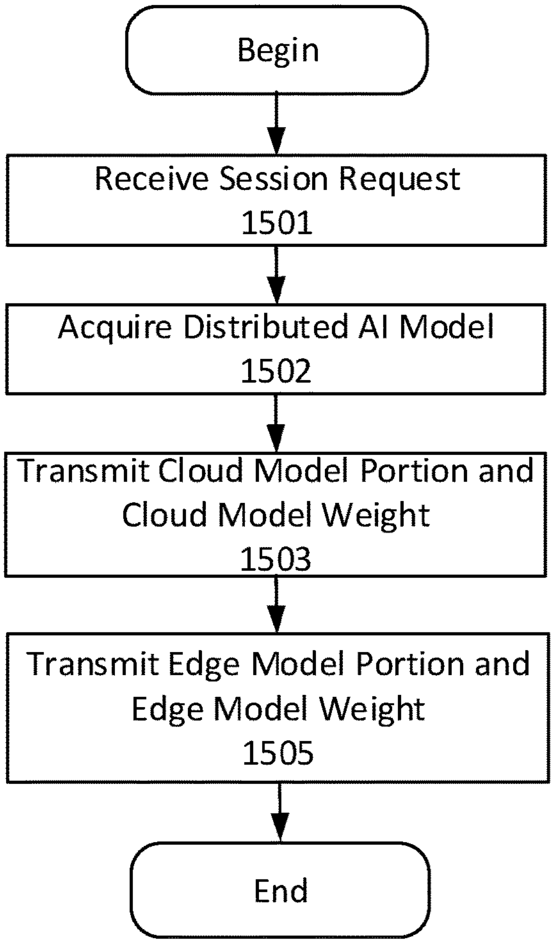
FIG. 15 is a flow chart illustrating operations of an SMF node according to some embodiments of inventive concepts.

Various operations from the flow chart of FIG. 15 may be optional with respect to some embodiments of SMF nodes and related methods. For example, operations of block 1501 of FIG. 15 may be optional.

Operations of a Network Data Analytic Function, NWDAF, node (implemented using the structure of Core Network Node 500 of FIG. 13) will now be discussed with reference to the flow chart of FIG. 16 according to some embodiments of inventive concepts. For example, modules may be stored in memory 505 of FIG. 13, and these modules may provide instructions so that when the instructions of a module are executed by respective CN node processing circuitry 1303, processing circuitry 1303 performs respective operations of the flow chart.

According to some embodiments at block 1607, processing circuitry 1303 receives (through network interface 1307) a distributed artificial intelligence AI model for an application service, wherein the AI model includes network QoS parameters for the application service. Operations of block 1607 may be performed, for example, as discussed above with respect to operation 507 of FIG. 5B. For example, the distributed AI model with the network QoS parameters may be received from a policy control function, PCF, node of the communication network.

According to some embodiments at block 1617, processing circuitry 1303 reports (through network interface 1307) an alarm based on the network QoS parameters for the application service. Operations of block 1617 may be performed, for example, as discussed above with respect to operation 617 of FIG. 6C. For example, reporting the alarm may include transmitting the alarm through a policy control function PCF node to a network exposure function NEF node.

According to some embodiments, the network QoS parameters for the application service may include at least one of an individual accuracy and inference time IAI for the AI model, a local accuracy and inference time LAI for the AI model, an edge accuracy and inference time EAI for the AI model, and/or a cloud accuracy and inference time CAI for the AI model. In addition, the network QoS parameters may include a trigger threshold associated with at least one of the IAI, LAI, EAI, and/or CAI, wherein the trigger threshold defines a value of at least one of the IAI, LAI, EAI, and/or CAI that is used to trigger an adaptation of the AI model.

According to some embodiments, the alarm may be reported responsive to at least one of the IAI, LAI, EAI, and/or CAI falling below the trigger threshold.

According to some other embodiments, the network QoS parameters may further include an in-advance trigger time, wherein the in-advance trigger time is used to report the alarm in advance of the at least one of the IAI, LAI, EAI, and/or CAI falling below the trigger threshold. For example, the alarm may be reported responsive to predicting that at least one of the IAI, LAI, EAI, and/or CAI will fall below the trigger threshold within the in-advance trigger time.

Figure 16:
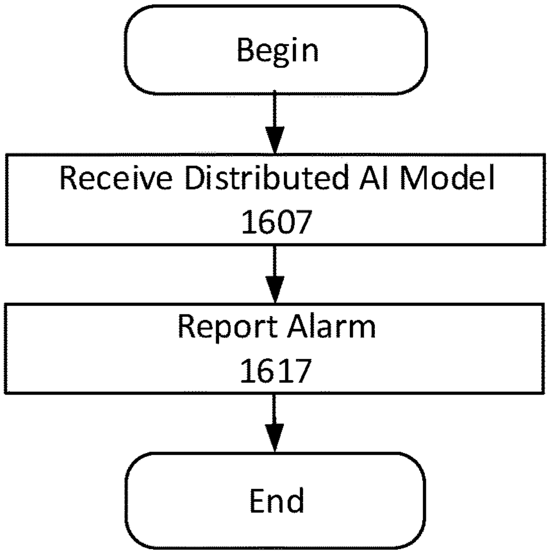
FIG. 16 is a flow chart illustrating operations of an NWDAF node according to some embodiments of inventive concepts.

Various operations from the flow chart of FIG. 16 may be optional with respect to some embodiments of NWDAF nodes and related methods.

Explanations are provided below for various abbreviations/acronyms used in the present disclosure.

ABBREVIATION EXPLANATION

3GPP 3rd Generation Partnership Project
5G 5th Generation
5QI 5G QoS Identifier
6G 6th Generation
AF Application Function
AI Artificial Intelligence
AMF Access and Mobility Function
AN Access Network
AS Application Server
AUSF Authentication Server Function
CAI Cloud Accuracy & Inference time
CL Classifier
CN Core Network
CP Control Plane
CPU Central Processing Unit
D2D Device-to-Device
D-AI Distributed Artificial Intelligence
DN Data Network
DNN Deep Neural Network
DDNN Distributed Deep Neural Network
EAI Edge Accuracy & Inference time
FL Federated Learning
FOV Field of View
IAI Individual Accuracy & Inference time
IoT Internet of Things
IP Internet Protocol
KPI Key Performance Indicator
LAI Local Accuracy & Inference time
MDF Model Deployment Function
MDM Model Deployment Map
NEF Network Exposure Function
NF Network Function
NRF Network Repository Function
NSSF Network Slice Selection Function
NWDAF NetWork Data Analytic Function
O&M Operations and Management
QoS Quality of Service
PCF Policy Control Function
PDU Protocol Data Unit
RAN Radio Access Network
SBA Service Based Architecture
SLA Service Level Agreement
SMF Session Management Function
SNI Server Name Indication
UAV Unmanned Aerial Vehicle
UGV Unmanned Ground Vehicle
UDM Unified Data Management
UE User Equipment
UP User Plane
UPF User Plane Function References are identified below.

Reference [1] Teerapittayanon, Surat, Bradley McDanel, and Hsiang-Tsung Kung. "Distributed deep neural networks over the cloud, the edge and end devices." 2017 IEEE 37th International Conference on Distributed Computing Systems (ICDCS). IEEE, 2017.
Reference [2] 3GPP TS 23.501 V16.6.0 (2020-09), System Architecture for 5G system (5GS), Stage 2 (Release 16), https://portal.3gpp.org/desktopmodules/Specifications/SpecificationDetails.aspx?specificationId=3144
Reference [3] 3GPP TS 23.502 V16.6.0 (2020-09), Procedures for the 5G system (5GS), Stage 2 (Release 16), https://portal.3gpp.org/desktopmodules/Specifications/SpecificationDetails.aspx?specificationId=3145
Reference [4] S1-193606, Study on traffic characteristics and performance requirements for AI/ML model transfer in 5GS, 3GPP TSG-SA WG1 Meeting #88, Reno, Nevada, USA, 18-22 Nov. 2019

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 17:
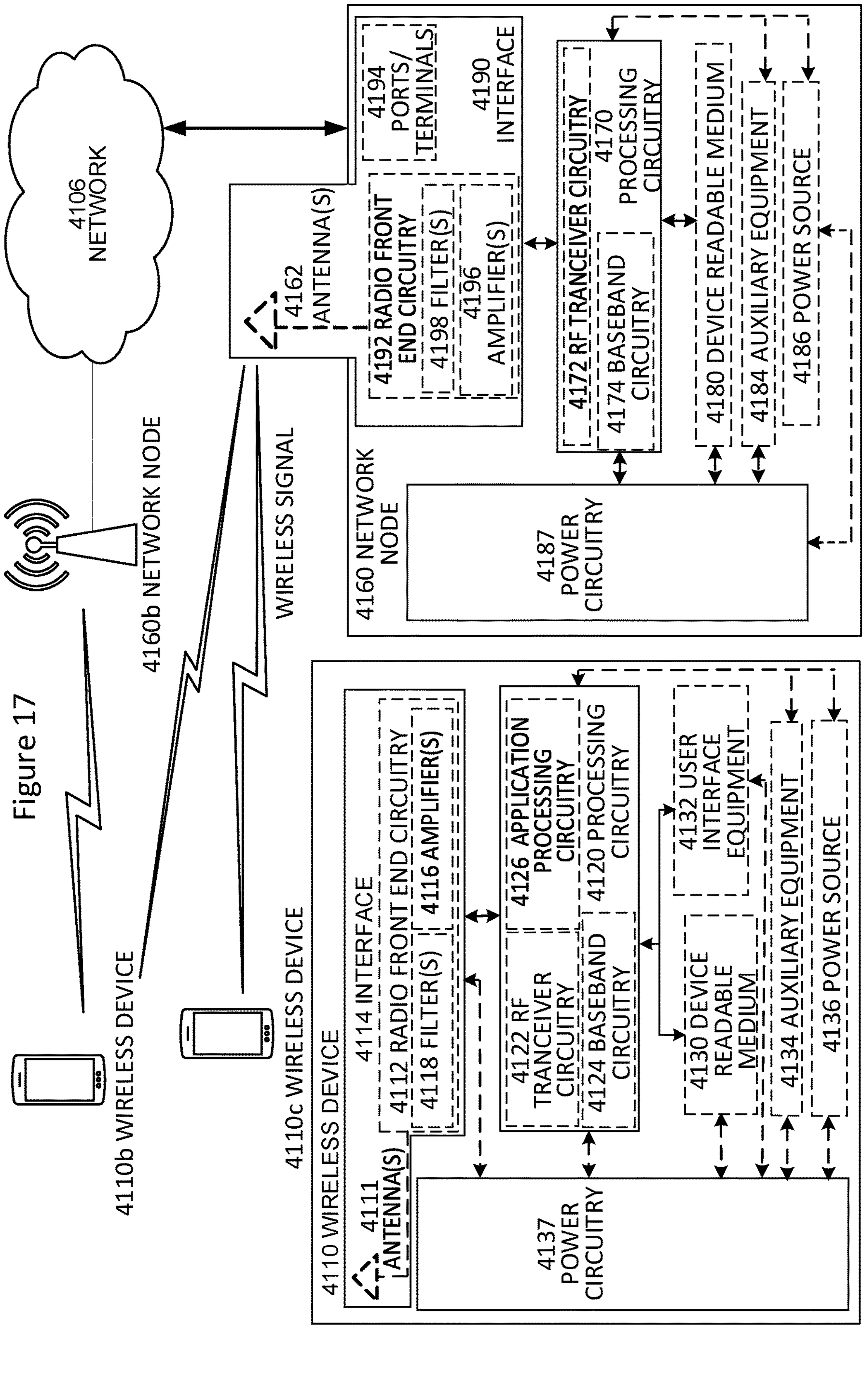
FIG. 17 is a block diagram of a wireless network in accordance with some embodiments.

FIG. 17 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 17. For simplicity, the wireless network of FIG. 17 only depicts network 4106, network nodes 4160 and **4160*b*, and WDs 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110** are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 17, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 17 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 17 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 18:
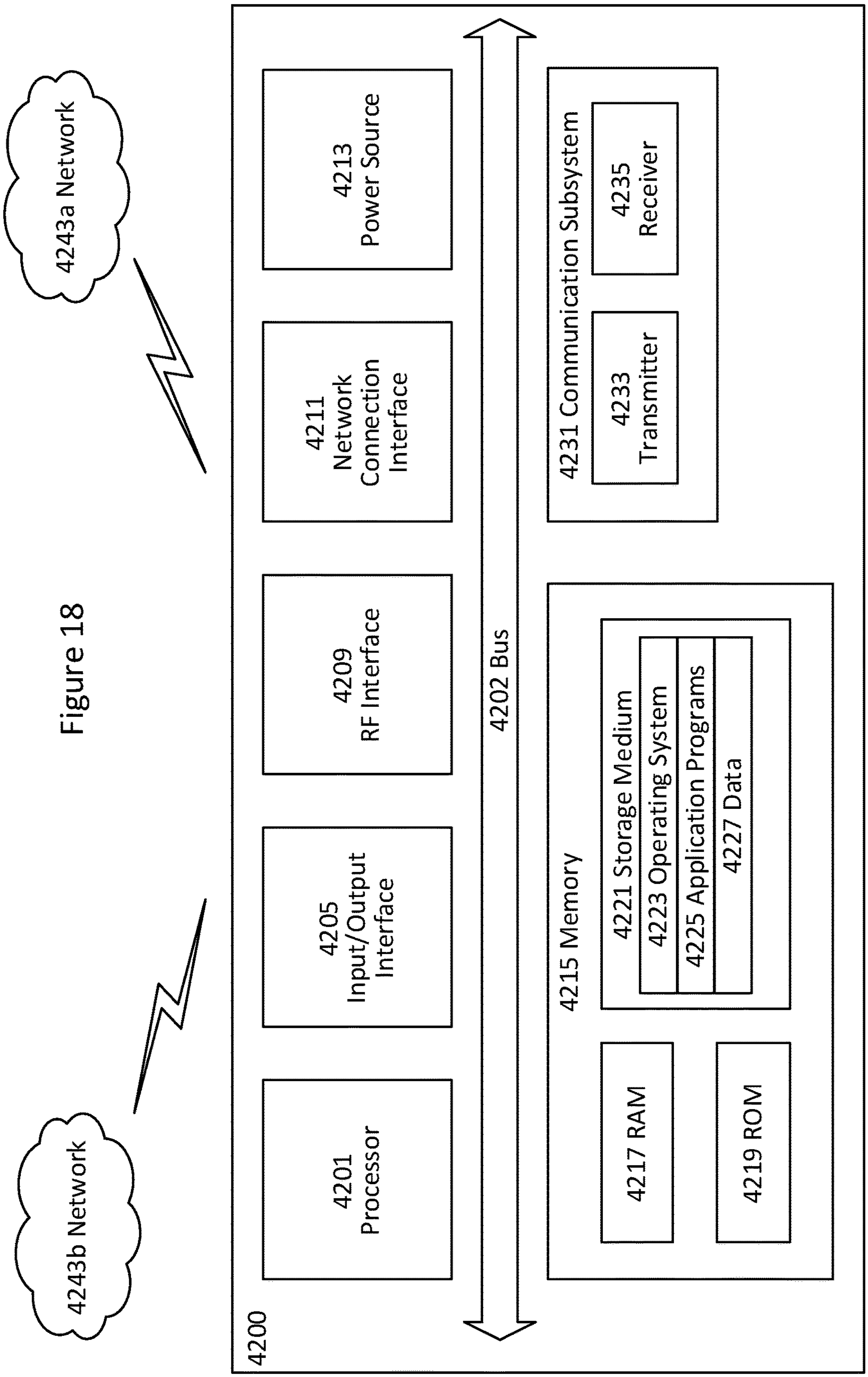
FIG. 18 is a block diagram of a user equipment in accordance with some embodiments

FIG. 18 illustrates a user Equipment in accordance with some embodiments.

FIG. 18 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 18, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 18 is a UE, the components discussed herein are equally applicable to a WD, and vice-versa.

In FIG. 18, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 18, or only a subset of the components. The level of integration between the components may vary from one UE to another UE. Further, certain UEs may contain multiple instances of a component, such as multiple processors, memories, transceivers, transmitters, receivers, etc.

In FIG. 18, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 18, RF interface 4209 may be configured to provide a communication interface to RF components such as a transmitter, a receiver, and an antenna. Network connection interface 4211 may be configured to provide a communication interface to network **4243*a*. Network 4243*a* may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211** may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 18, processing circuitry 4201 may be configured to communicate with network 4243*b* using communication subsystem 4231. Network 4243*a* and network 4243*b* may be the same network or networks or different network or networks. Communication subsystem 4231 may be configured to include one or more transceivers used to communicate with network 4243*b*. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243*b* may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 19:
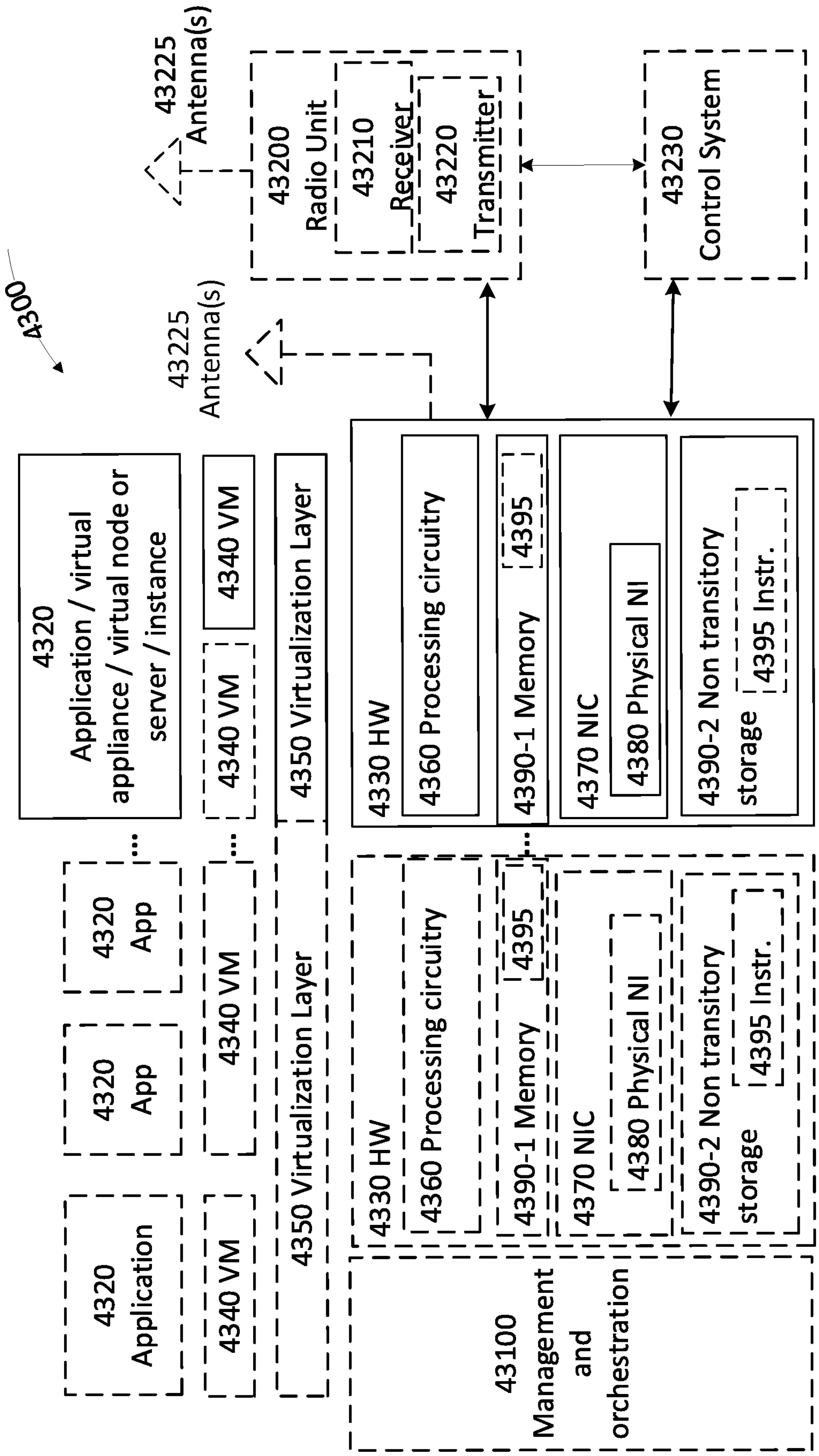
FIG. 19 is a block diagram of a virtualization environment in accordance with some embodiments.

FIG. 19 illustrates a virtualization environment in accordance with some embodiments.

FIG. 19 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 19, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 19.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 20:
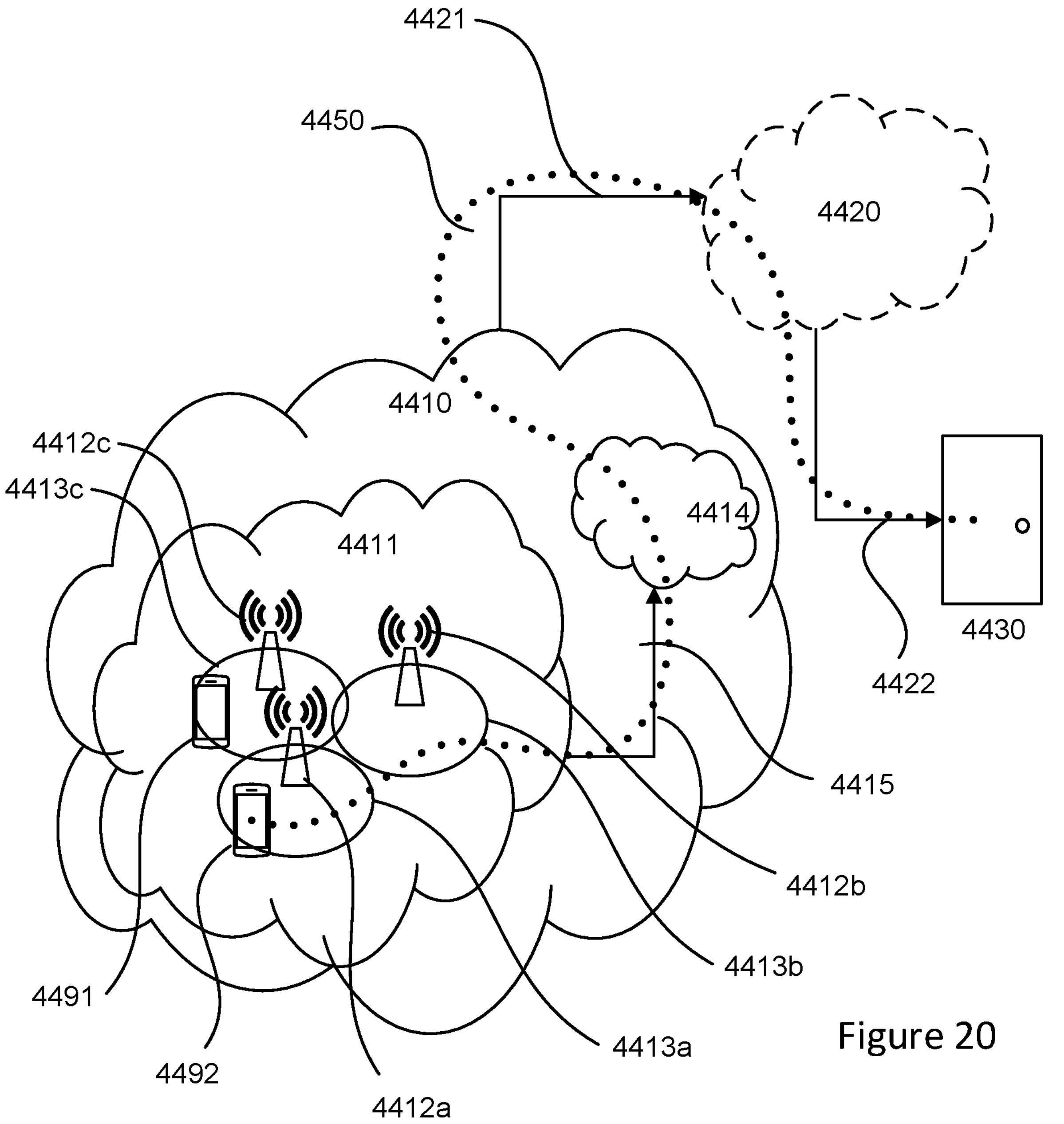
FIG. 20 is a block diagram of a telecommunication network connected via an intermediate network to a host computer in accordance with some embodiments.

FIG. 20 illustrates a telecommunication network connected via an intermediate network to a host computer in accordance with some embodiments.

With reference to FIG. 20, in accordance with an embodiment, a communication system includes telecommunication network 4410, such as a 3GPP-type cellular network, which comprises access network 4411, such as a radio access network, and core network 4414. Access network 4411 comprises a plurality of base stations 4412*a*, 4412*b*, 4412*c*, such as NBs, eNBs, gNBs or other types of wireless access points, each defining a corresponding coverage area 4413*a*, 4413*b*, 4413*c*. Each base station 4412*a*, 4412*b*, 4412*c* is connectable to core network 4414 over a wired or wireless connection 4415. A first UE 4491 located in coverage area 4413*c* is configured to wirelessly connect to, or be paged by, the corresponding base station 4412*c*. A second UE 4492 in coverage area 4413*a* is wirelessly connectable to the corresponding base station 4412*a*. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 20 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 21:
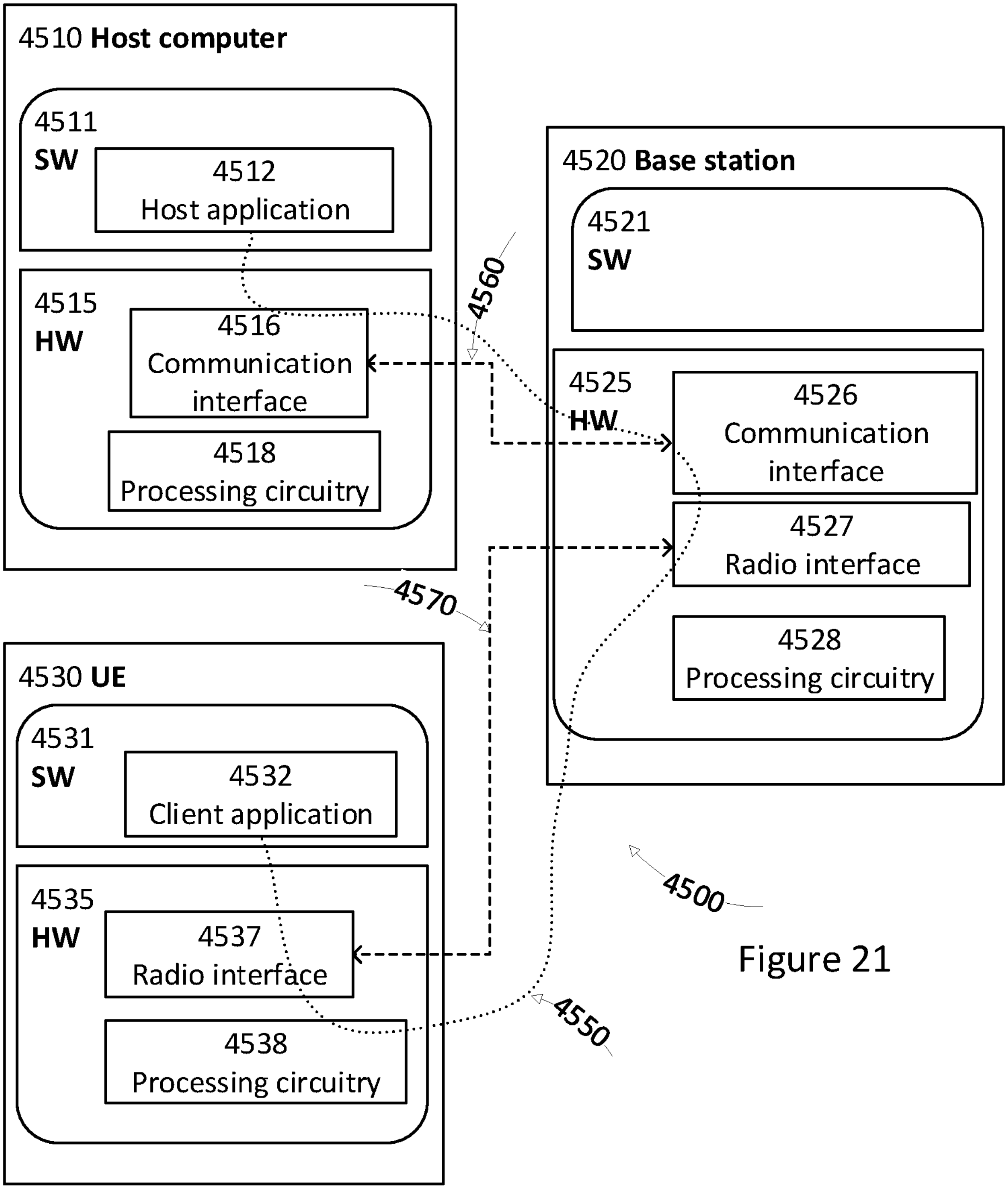
FIG. 21 is a block diagram of a host computer communicating via a base station with a user equipment over a partially wireless connection in accordance with some embodiments.

FIG. 21 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 21. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 21) served by base station 4520. Communication interface 4526 may be configured to facilitate connection 4560 to host computer 4510. Connection 4560 may be direct or it may pass through a core network (not shown in FIG. 21) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 21 may be similar or identical to host computer 4430, one of base stations 4412*a*, 4412*b*, 4412*c* and one of UEs 4491, 4492 of FIG. 20, respectively. This is to say, the inner workings of these entities may be as shown in FIG. 21 and independently, the surrounding network topology may be that of FIG. 20.

In FIG. 21, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 22:
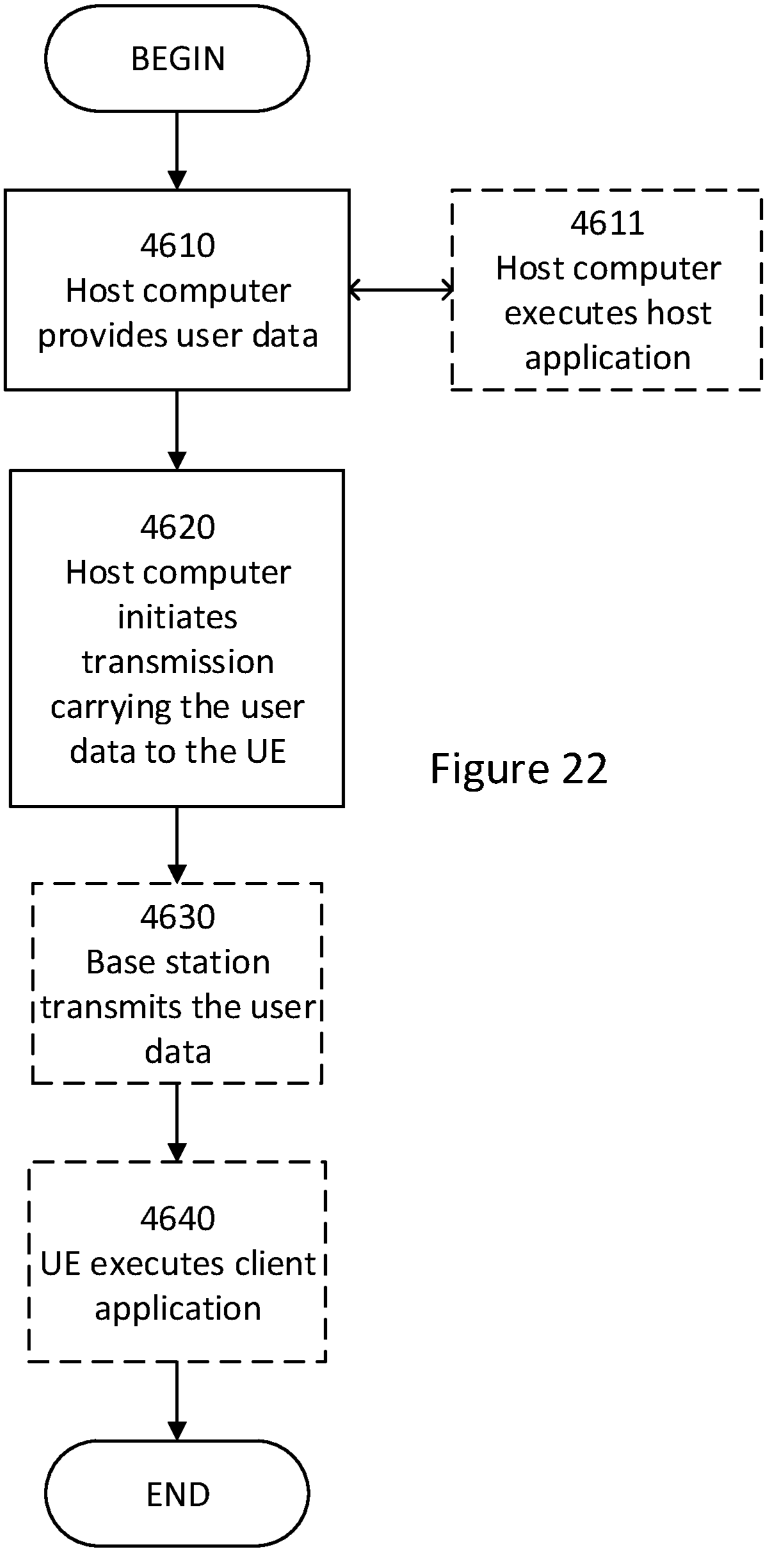
FIG. 22 is a block diagram of methods implemented in a communication system including a host computer, a base station and a user equipment in accordance with some embodiments.

FIG. 22 illustrates methods implemented in a communication system including a host computer, a base station and a user equipment in accordance with some embodiments.

FIG. 22 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 22 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 23:
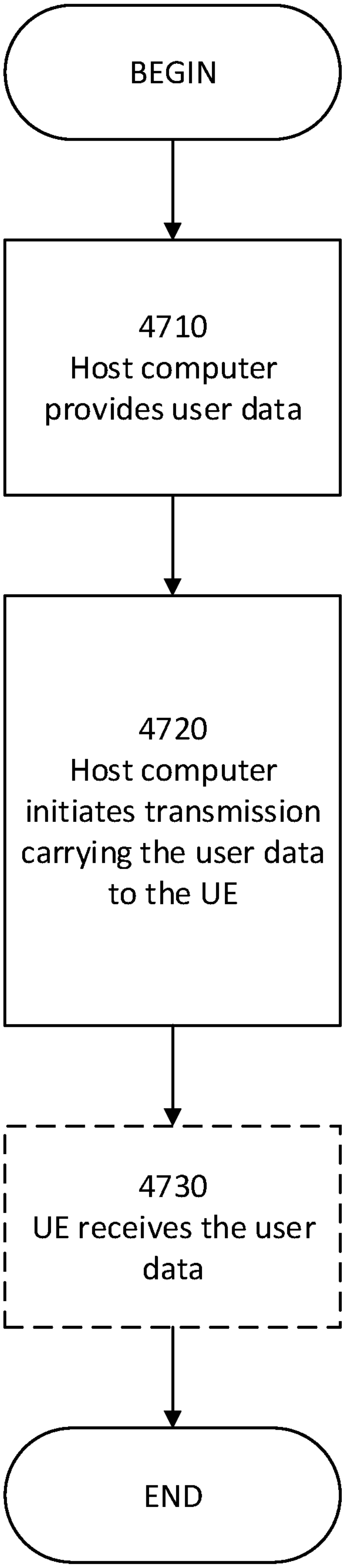
FIG. 23 is a block diagram of methods implemented in a communication system including a host computer, a base station and a user equipment in accordance with some embodiments.

FIG. 23 illustrates methods implemented in a communication system including a host computer, a base station and a user equipment in accordance with some embodiments.

FIG. 23 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 23 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 24:
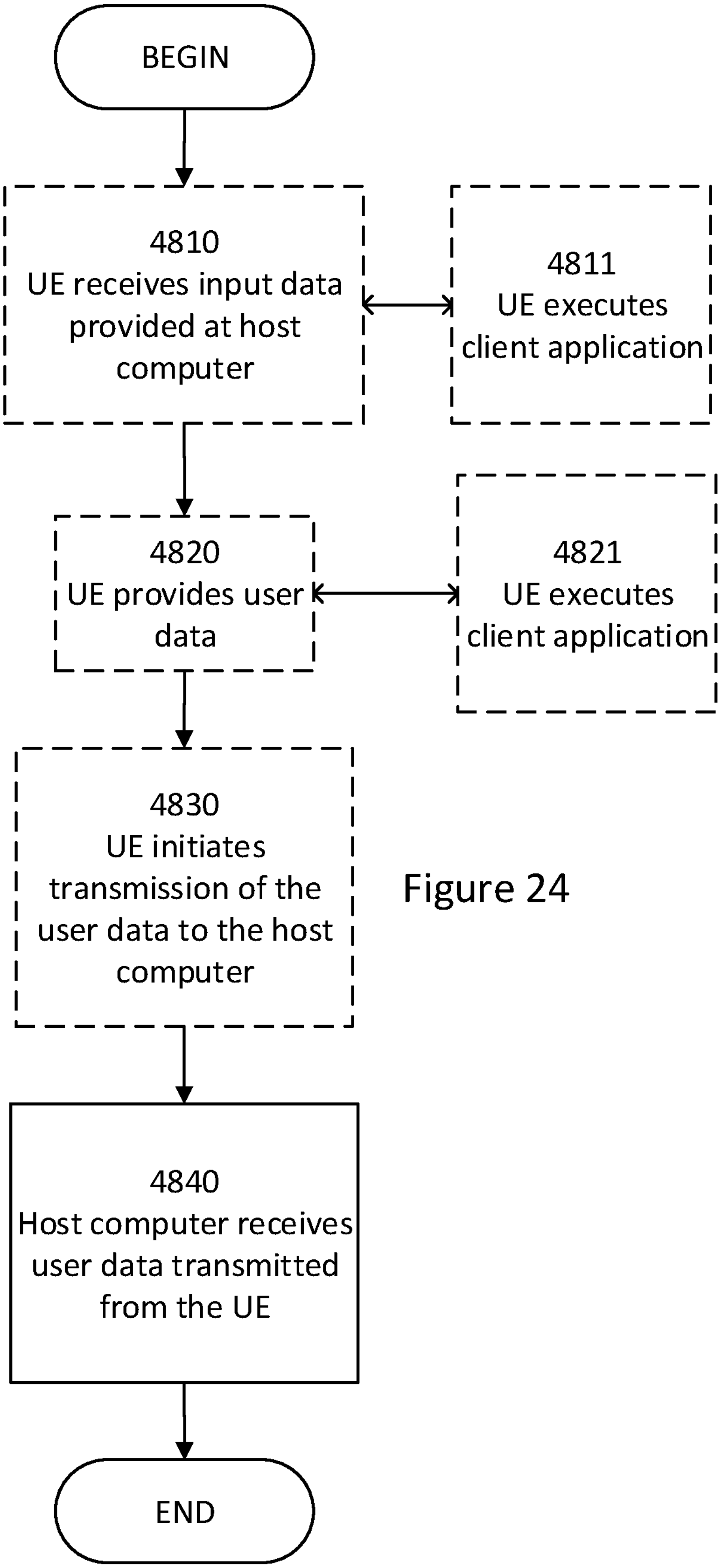
FIG. 24 is a block diagram of methods implemented in a communication system including a host computer, a base station and a user equipment in accordance with some embodiments.

FIG. 24 illustrates methods implemented in a communication system including a host computer, a base station and a user equipment in accordance with some embodiments FIG. 24 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 24 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 25:
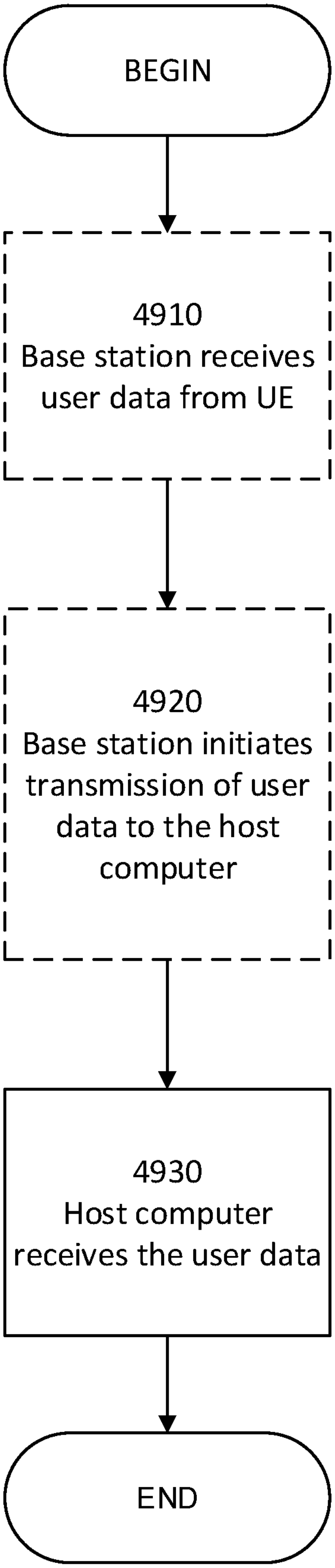
FIG. 25 is a block diagram of methods implemented in a communication system including a host computer, a base station and a user equipment in accordance with some embodiments.

FIG. 25 illustrates methods implemented in a communication system including a host computer, a base station and a user equipment in accordance with some embodiments.

FIG. 25 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 25 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being “connected”, “coupled”, “responsive”, or variants thereof to another element, it can be directly connected, coupled, or responsive to the other element or intervening elements may be present. In contrast, when an element is referred to as being “directly connected”, “directly coupled”, “directly responsive”, or variants thereof to another element, there are no intervening elements present. Like numbers refer to like elements throughout. Furthermore, “coupled”, “connected”, “responsive”, or variants thereof as used herein may include wirelessly coupled, connected, or responsive. As used herein, the singular forms “a”, “an” and “the” are intended to include the plural forms as well, unless the context clearly indicates otherwise. Well-known functions or constructions may not be described in detail for brevity and/or clarity. The term “and/or” (abbreviated “/”) includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a core network, CN, node in a communication network, the method comprising:

acquiring a distributed artificial intelligence, AI, model for a communication device, from a policy control function, PCF, node of the communication network, wherein the distributed AI model includes a cloud model portion and a cloud model weight, an edge model portion and an edge model weight, and a local model portion and a local model weight, and wherein acquiring the distributed AI model from the PCF node comprises receiving model deployment map, MDM, information specifying an apportionment of the cloud model portion, the edge model portion, and the local model portion among the UPF node, the RAN node, and the communication device, respectively;

transmitting the cloud model portion and the cloud model weight to a user plane function, UPF, node of the communication network according to the MDM information;

transmitting the edge model portion and the edge model weight and the local model portion and the local model weight for distribution to a radio access network, RAN, node associated with the communication device according to the MDM information; and enabling execution of the distributed AI model across the communication network using the transmitted cloud model portion and cloud model weight at the UPF node and the transmitted edge model portion, edge model weight, local model portion, and local model weight at the RAN node.

2. The method of claim 1 further comprising:

receiving a session request for a session for an AI service associated with the distributed AI model from the communication device;

wherein the distributed AI model is acquired responsive to receiving the session request from the communication device.

3. The method of claim 2, wherein the session request comprises a request to establish and/or update the session for the distributed AI model.

4. The method of claim 2, wherein the session for the distributed AI model comprises a protocol data unit, PDU, session for the distributed AI model.

5. The method of claim 2, wherein transmitting the edge model portion and the edge model weight and the local model portion and the local model weight comprises transmitting a session response for the session for the distributed AI model, wherein the session response is transmitted in response to the session request, and wherein the session response includes the edge model portion and the edge model weight and the local model portion and the local model weight.

6. The method of claim 5, wherein the session response is transmitted through an access and mobility function, AMF, node of the communication network to the RAN node associated with the communication node.

7. The method of claim 6, wherein the session request is received from the communication device through the RAN node and the AMF node.

8. The method of claim 5, wherein the session response includes an Internet Protocol, IP, address to be allocated to the communication device for traffic of the distributed AI model.

* * * * *